US011875613B2

United States Patent
Marasigan et al.

(10) Patent No.: US 11,875,613 B2
(45) Date of Patent: *Jan. 16, 2024

(54) MOTION-BASED TRANSPORT ASSESSMENT

(71) Applicant: TOYOTA MOTOR NORTH AMERICA, INC., Plano, TX (US)

(72) Inventors: Joshua V. Marasigan, Carrollton, TX (US); Robert D. Slater, Murphy, TX (US); Felipe G. Salles, Garland, TX (US); Jaya Bharath R. Goluguri, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,230

(22) Filed: Aug. 17, 2022

(65) Prior Publication Data
US 2022/0392277 A1 Dec. 8, 2022

Related U.S. Application Data

(63) Continuation of application No. 16/823,974, filed on Mar. 19, 2020, now Pat. No. 11,488,424.

(51) Int. Cl.
*G06F 16/00* (2019.01)
*G07C 5/02* (2006.01)
(Continued)

(52) U.S. Cl.
CPC ........... *G07C 5/02* (2013.01); *G06F 16/2379* (2019.01); *G06F 16/43* (2019.01); *G06V 20/56* (2022.01)

(58) Field of Classification Search
CPC ..... G06F 16/2379; G06F 16/43; G07C 5/008; G07C 5/02; G07C 5/0866
See application file for complete search history.

(56) References Cited

U.S. PATENT DOCUMENTS 5,339,075 A 8/1994 Abst et al.
5,808,561 A 9/1998 Kinoshita et al.
(Continued)

FOREIGN PATENT DOCUMENTS

AU 2017100399 A4 5/2017
CN 100437660 C 11/2008
(Continued)

OTHER PUBLICATIONS

Hu et al., "Semantic-Based Surveillance Video Retrieval," IEEE Transactions On Image Processing, vol. 16, No. 4, Apr. 2007, pp. 1168-1181. (Year: 2007).*
(Continued)

*Primary Examiner* — Cheryl Lewis

(57) ABSTRACT

An example operation includes one or more of obtaining, by a moving vehicle, a first data including one or more of at least one first video and at least one first image of a moving transport, analyzing the first data, by the moving vehicle, to determine an initial issue, querying, by the moving vehicle, a server for a second data based on the analyzing, wherein the second data is one or more of at least one second video and at least one second image of the moving transport at a previous time, verifying, by the moving vehicle, an issue exists based on a delta above a threshold between the first data and the second data, and sending, by the moving vehicle, the verified issue to the server.

20 Claims, 29 Drawing Sheets

(51) Int. Cl.
   *G06F 16/23* (2019.01)
   *G06F 16/43* (2019.01)
   *G06V 20/56* (2022.01)

(56) References Cited

U.S. PATENT DOCUMENTS

| | | |
|---|---|---|
| 6,337,638 B1 | 1/2002 | Bates et al. |
| 6,856,873 B2 | 2/2005 | Breed et al. |
| 6,882,287 B2 | 4/2005 | Schofield |
| 6,985,089 B2 | 1/2006 | Liu et al. |
| 7,016,783 B2 | 3/2006 | Hac et al. |
| 7,184,866 B2 | 2/2007 | Squires et al. |
| 7,190,260 B2 | 3/2007 | Rast |
| 7,260,465 B2 | 8/2007 | Waldis et al. |
| 7,348,895 B2 | 3/2008 | Lagassey |
| 7,425,076 B2 | 9/2008 | Schofield et al. |
| 7,599,521 B2 | 10/2009 | Watanabe et al. |
| 7,610,146 B2 | 10/2009 | Breed |
| 7,734,061 B2 | 6/2010 | Breed et al. |
| 7,920,969 B2 | 4/2011 | Mudalige et al. |
| 8,301,108 B2 | 10/2012 | Naboulsi |
| 8,676,466 B2 | 3/2014 | Mudalige |
| 8,823,530 B2 | 9/2014 | Green et al. |
| 8,884,782 B2 | 11/2014 | Rubin et al. |
| 8,995,662 B2 | 3/2015 | Rubin et al. |
| 8,996,224 B1 | 3/2015 | Herbach et al. |
| 9,096,267 B2 | 8/2015 | Mudalige et al. |
| 9,227,632 B1 | 1/2016 | Lee |
| 9,229,453 B1 | 1/2016 | Lee |
| 9,428,187 B2 | 8/2016 | Lee |
| 9,457,807 B2 | 10/2016 | Lee et al. |
| 9,463,805 B2 | 10/2016 | Kirsch et al. |
| 9,711,050 B2 | 7/2017 | Ansari |
| 9,805,266 B2 | 10/2017 | Zhang et al. |
| 9,947,224 B2 | 4/2018 | Fairfield et al. |
| 10,020,995 B2 | 7/2018 | Ricci et al. |
| 10,215,583 B2 | 2/2019 | Ng-Thow-Hing et al. |
| 10,229,587 B2 | 3/2019 | Anschutz et al. |
| 10,231,187 B1 | 3/2019 | Rubin et al. |
| 11,097,735 B1 | 8/2021 | Marasigan et al. |
| 11,332,130 B2 | 5/2022 | Lee |
| 2005/0131595 A1 | 6/2005 | Luskin et al. |
| 2006/0092043 A1 | 5/2006 | Lagassey |
| 2008/0243558 A1 | 10/2008 | Gupte |
| 2012/0086582 A1 | 4/2012 | Durekovic et al. |
| 2012/0314070 A1 | 12/2012 | Zhang et al. |
| 2013/0050491 A1 | 2/2013 | Lin et al. |
| 2014/0300739 A1 | 10/2014 | Mimar |
| 2015/0127190 A1 | 5/2015 | Fuehrer |
| 2015/0344038 A1 | 12/2015 | Stenneth et al. |
| 2016/0231746 A1 | 8/2016 | Hazelton et al. |
| 2017/0168503 A1 | 6/2017 | Amla et al. |
| 2017/0203770 A1 | 7/2017 | Kondo |
| 2017/0318360 A1 | 11/2017 | Tran et al. |
| 2018/0001819 A1 | 1/2018 | Imbe |
| 2018/0017962 A1 | 1/2018 | Miller et al. |
| 2018/0075739 A1 | 3/2018 | Ginsberg et al. |
| 2018/0202822 A1 | 7/2018 | DeLizio |
| 2019/0043351 A1 | 2/2019 | Yang et al. |
| 2019/0061765 A1 | 2/2019 | Marden et al. |
| 2019/0101933 A1 | 4/2019 | Dudar |
| 2019/0244301 A1 | 8/2019 | Seth et al. |
| 2019/0315359 A1 | 10/2019 | Park et al. |
| 2019/0333381 A1 | 10/2019 | Shalev-Shwartz et al. |
| 2020/0110404 A1 | 4/2020 | Shiga et al. |
| 2020/0130711 A1 | 4/2020 | Turek et al. |
| 2020/0153494 A1 | 5/2020 | Park et al. |
| 2020/0166950 A1 | 5/2020 | Hase et al. |
| 2020/0168006 A1 | 5/2020 | Kuramochi et al. |
| 2020/0168007 A1 | 5/2020 | Kuramochi et al. |
| 2020/0180635 A1 | 6/2020 | Hong |
| 2020/0183420 A1 | 6/2020 | Kim |
| 2020/0269842 A1 | 8/2020 | Kato et al. |
| 2020/0298748 A1 | 9/2020 | Nam et al. |
| 2021/0012652 A1 | 1/2021 | Kong et al. |
| 2021/0034063 A1 | 2/2021 | Oguro et al. |
| 2021/0061265 A1 | 3/2021 | Furtado |
| 2021/0061292 A1 | 3/2021 | Bae |
| 2021/0206378 A1 | 7/2021 | Wang |
| 2021/0208273 A1 | 7/2021 | Yu et al. |
| 2021/0319700 A1 | 10/2021 | Kang |
| 2021/0362713 A1 | 11/2021 | Fujimaki et al. |
| 2022/0089157 A1 | 3/2022 | Ito et al. |
| 2022/0144273 A1 | 5/2022 | Yamaguchi et al. |
| 2022/0234607 A1 | 7/2022 | Hata et al. |
| 2022/0292982 A1 | 9/2022 | Brandin et al. |
| 2022/0315003 A1 | 10/2022 | Hong |
| 2023/0005374 A1 | 1/2023 | Elimaleh et al. |

FOREIGN PATENT DOCUMENTS

| | | |
|---|---|---|
| CN | 101002239 B | 12/2010 |
| CN | 101876751 B | 10/2012 |
| CN | 101326511 B | 1/2013 |
| CN | 102254429 B | 7/2013 |
| CN | 101055176 B | 8/2013 |
| CN | 102076541 B | 8/2013 |
| CN | 103606270 A | 2/2014 |
| CN | 102163368 A | 10/2014 |
| CN | 104271420 B | 6/2017 |
| CN | 107264531 B | 7/2019 |
| CN | 111267842 A | 6/2020 |
| DE | 102004013818 A1 | 10/2005 |
| EP | 1388017 B1 | 4/2009 |
| IN | 6091CHE2014 A | 12/2014 |
| JP | 2006347493 A | 12/2006 |
| KR | 101560682 B1 | 10/2015 |
| WO | 2019089749 A1 | 5/2019 |
| WO | 2019108213 A1 | 6/2019 |

OTHER PUBLICATIONS

Qiu et al., "Kestrel: Video Analytics for Augmented Multi-Camera Vehicle Tracking," 2018 IEEE/ACM Third International Conference on Internet-of-Things Design and Implementation, pp. 48-59. (Year: 2018).*

U.S. Appl. No. 16/824,471, filed Mar. 19, 2020, Joshua V. Marasigan.

Gandhi et al., "Video Based Surround Vehicle Detection, Classification and Logging from Moving Platforms: Issues and Approaches," Proceedings of the 2007 IEEE Intelligent Vehicles Symposium Istanbul, Turkey, Jun. 13-15, 2007, pp. 1067-1071. (Year: 2007).

Momin et al., "Vehicle Detection and Attribute Based Search of Vehicles in Video Surveillance System," 2015 International Conference o Circuit, Power and Computing Technologies [ICCPCT], pp. 1-4. (Year: 2015).

Non Final Office Action dated Jul. 10, 2020, issued in a related U.S. Appl. No. 16/824,471.

* cited by examiner

140

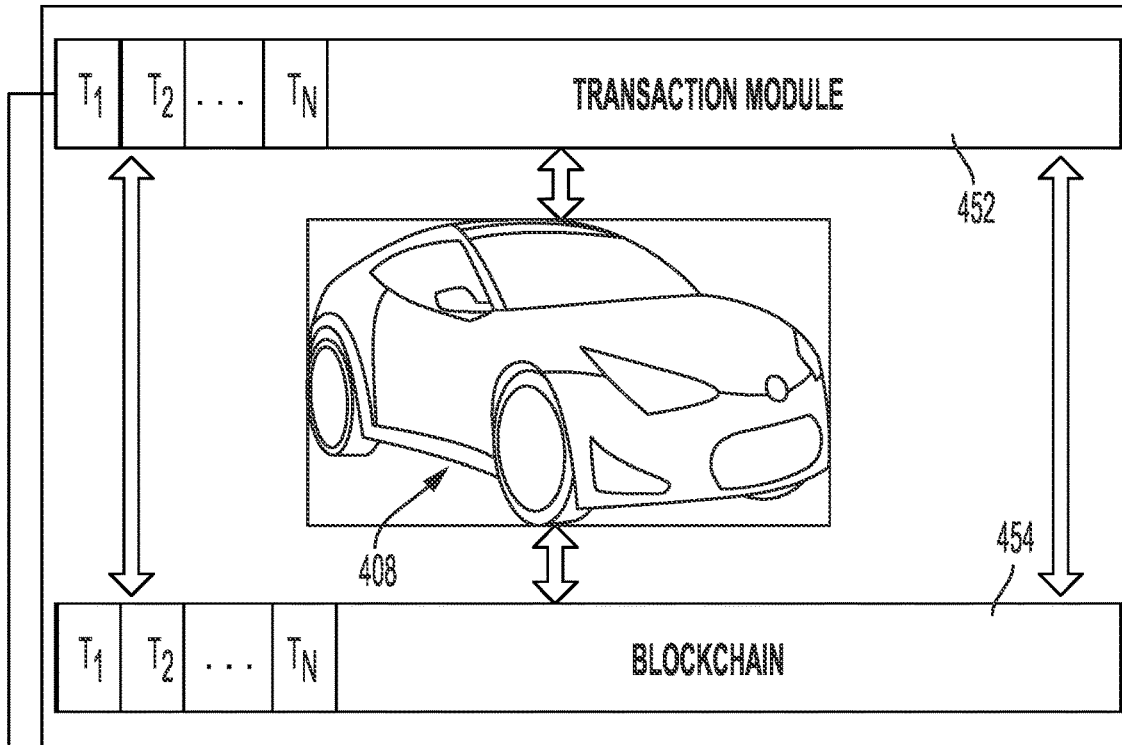
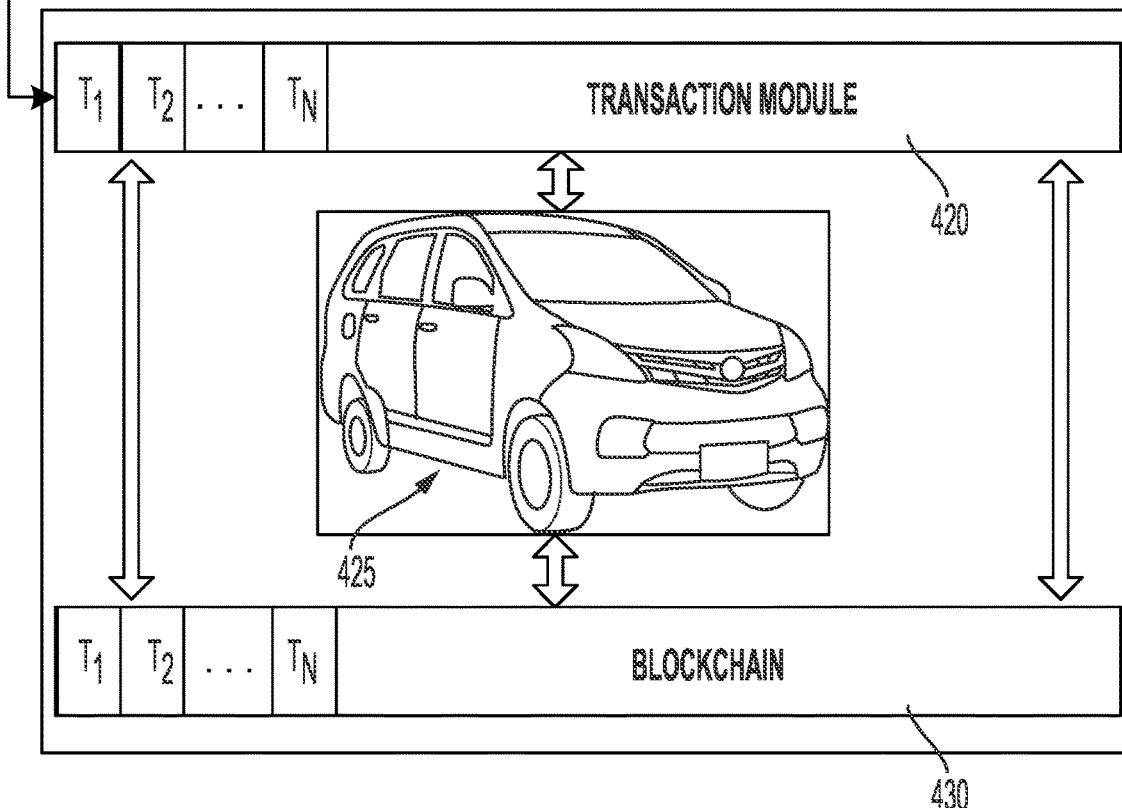
FIG. 4C

MOTION-BASED TRANSPORT ASSESSMENT

TECHNICAL FIELD

This application generally relates to safety of transports, and more particularly, to motion-based transport assessment.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer, or a tablet.

Vehicles in motion may have issues that may be undetected by the driver and cause dangerous situations on the roadway. It is often difficult for a driver of a vehicle to be aware of issues that may have arisen when the vehicle is in route to a destination. Many accidents involving transports occur at highway exits. If a transport is moving fast in a middle lane, it may not be able to exit the highway at high speed without creating an unsafe situation. In this situation, the transport needs to contact other transports and resolve their speeds and positioning in order to perform a safe maneuver or exit the highway. In other words, an automated approach for improvement of the flow of traffic and prevention of accidents through maneuvering of multiple transports is needed. Another situation that may become a problem is when a transport traveling faster comes up behind a slower transport in the left-hand lane. A choice now needs to be made. In one case, that transport may come up close to the slower transport with the understanding that the slower transport will understand that the transport behind desires to proceed, and the slower transport will move into another lane. In another case, the faster transport will wait until an opening occurs in another lane and will enter the lane, speed up and pass the slower transport while remaining in the other lane or maneuvering back to the left lane. In both of the above examples, as well as any situation where one transport is seeking to pass another transport (and maneuver back into the original lane) unsafe and inefficient driving situations may arise. Therefore, what is needed are solutions to overcome these problems and limitations.

SUMMARY

One example embodiment may provide a method that includes one or more of detecting, by a processor of a transport, an exit on a road, calculating, by the processor of the transport, a probability that the transport is not prepared to exit, requesting, by the processor of the transport, at least one other transport proximate to the transport to alter its speed if the probability exceeds a threshold, and responsive to detecting an altering of the speed by the at least one other transport, triggering the transport to exit the road.

Another example embodiment may provide a method that includes one or more of obtaining, by a moving vehicle, a first data including one or more of at least one first video and at least one first image of a moving transport, analyzing the first data, by the moving vehicle, to determine an initial issue, querying, by the moving vehicle, a server for a second data based on the analyzing, wherein the second data is one or more of at least one second video and at least one second image of the moving transport at a previous time, verifying, by the moving vehicle, an issue exists based on a delta above a threshold between the first data and the second data, and sending, by the moving vehicle, the verified issue to the server.

Yet another example embodiment may provide a method that includes one or more of traveling, by a first transport, in a first lane, determining, by the first transport, that a speed of a second transport is greater than a speed of the first transport when the second transport is behind the first transport, determining, by the first transport, that no other transports are ahead of the first transport by a first distance in the first lane and beside the first transport by a second distance in a second lane, maneuvering, by the first transport, to the second lane allowing the second transport to pass the first transport in the first lane, and maneuvering, by the first transport, to the first lane when there are no other transports traveling in the first lane at a third distance behind the first transport and at or near the speed of the second transport.

Another example embodiment may provide a system that includes a processor and memory, wherein the processor is configured to perform one or more of detect an exit on a road, calculate a probability that the transport is not prepared to exit, request at least one other transport proximate to the transport to alter its speed if the probability exceeds a threshold, and responsive to a detection of an altering of the speed by the at least one other transport, trigger the transport to exit the road.

Another example embodiment may provide a system that includes a processor and memory, wherein the processor is configured to perform one or more of obtain, by a moving vehicle, a first data including one or more of at least one first video and at least one first image of a moving transport, analyze the first data, by the moving vehicle, to determine an initial issue, query, by the moving vehicle, a server for a second data based on the analysis, wherein the second data is one or more of at least one second video and at least one second image of the moving transport at a previous time, verify, by the moving vehicle, an issue exists based on a delta above a threshold between the first data and the second data, and send, by the moving vehicle, the verified issue to the server.

Yet another example embodiment may provide a system that includes a processor and memory, wherein the processor is configured to perform one or more of determine that a speed of a second transport is greater than a speed of a first transport when the second transport is behind the first transport and the first transport is traveling in a first lane, determine that no other transports are ahead of the first transport by a first distance in the first lane and beside the first transport by a second distance in a second lane, maneuver to the second lane allowing the second transport to pass the first transport in the first lane, and maneuver to the first lane when there are no other transports in the first lane at a third distance behind the first transport and at or near the speed of the second transport.

A further example embodiment provides a non-transitory computer readable medium comprising instructions, that when read by a processor, cause the processor to perform one or more of detecting an exit on a road, calculating a probability that the transport is not prepared to exit, requesting at least one other transport proximate to the transport to alter its speed if the probability exceeds a threshold, and responsive to the detecting of an altering of the speed by the at least one other transport, triggering the transport to exit the road.

A further example embodiment provides a non-transitory computer readable medium comprising instructions, that when read by a processor, cause the processor to perform one or more of obtaining, by a moving vehicle, a first data including one or more of at least one first video and at least one first image of a moving transport, analyzing the first data, by the moving vehicle, to determine an initial issue, querying, by the moving vehicle, a server for a second data based on the analyzing, wherein the second data is one or more of at least one second video and at least one second image of the moving transport at a previous time, verifying, by the moving vehicle, an issue exists based on a delta above a threshold between the first data and the second data, and sending, by the moving vehicle, the verified issue to the server.

Yet a further example embodiment provides a non-transitory computer readable medium comprising instructions, that when read by a processor, cause the processor to perform one or more of traveling, by a first transport, in a first lane, determining, by the first transport, that a speed of a second transport is greater than a speed of the first transport when the second transport is behind the first transport, determining, by the first transport, that no other transports are ahead of the first transport by a first distance in the first lane and beside the first transport by a second distance in a second lane, maneuvering, by the first transport, to the second lane allowing the second transport to pass the first transport in the first lane, and maneuvering, by the first transport, to the first lane when there are no other transports traveling in the first lane at a third distance behind the first transport and at or near the speed of the second transport.

FIG. IF illustrates an example network diagram, according to example embodiments.

Figure 1A:
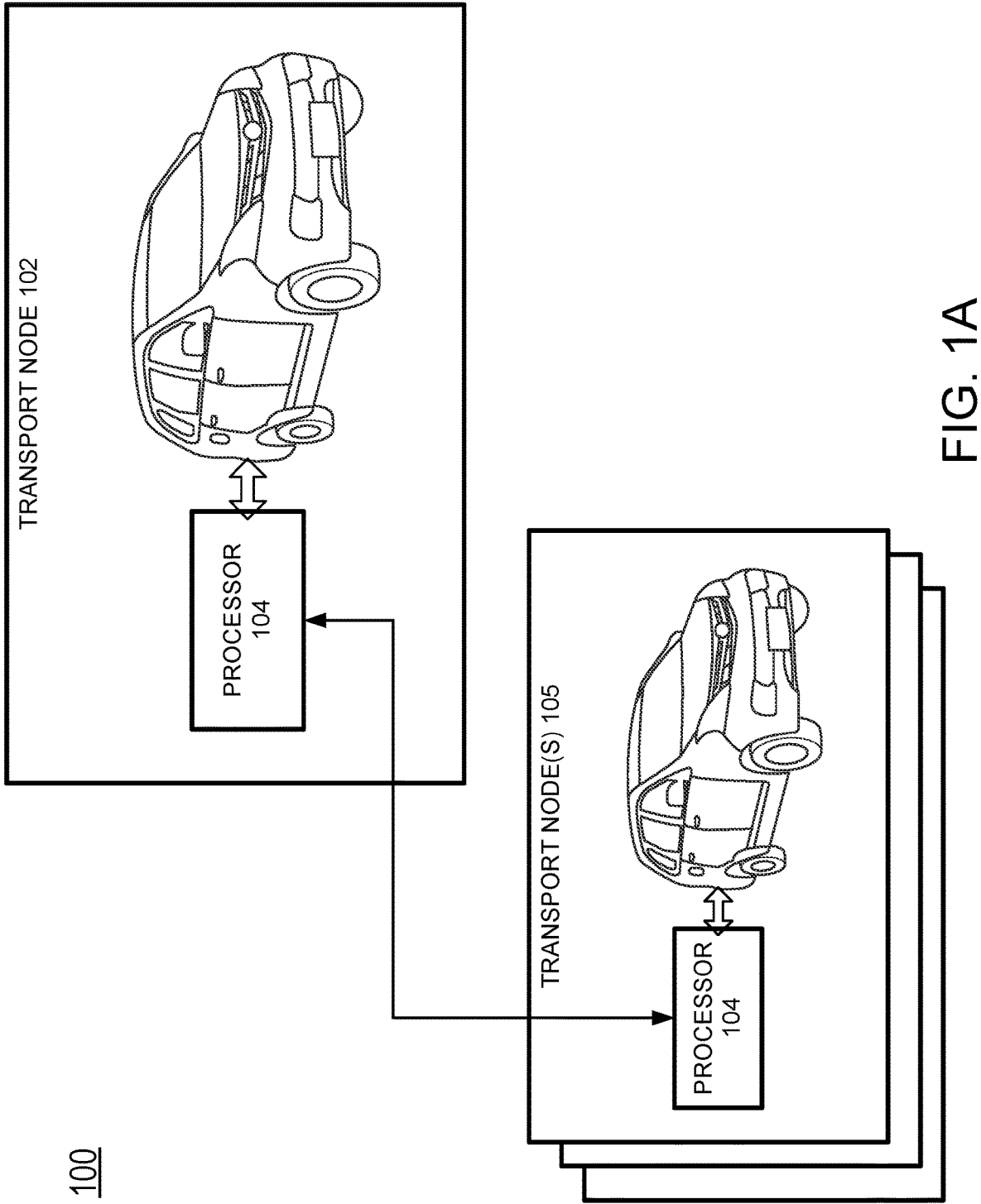
FIG. 1A illustrates a transport(s) network diagram in accordance to the example embodiments.
Figure 1B:
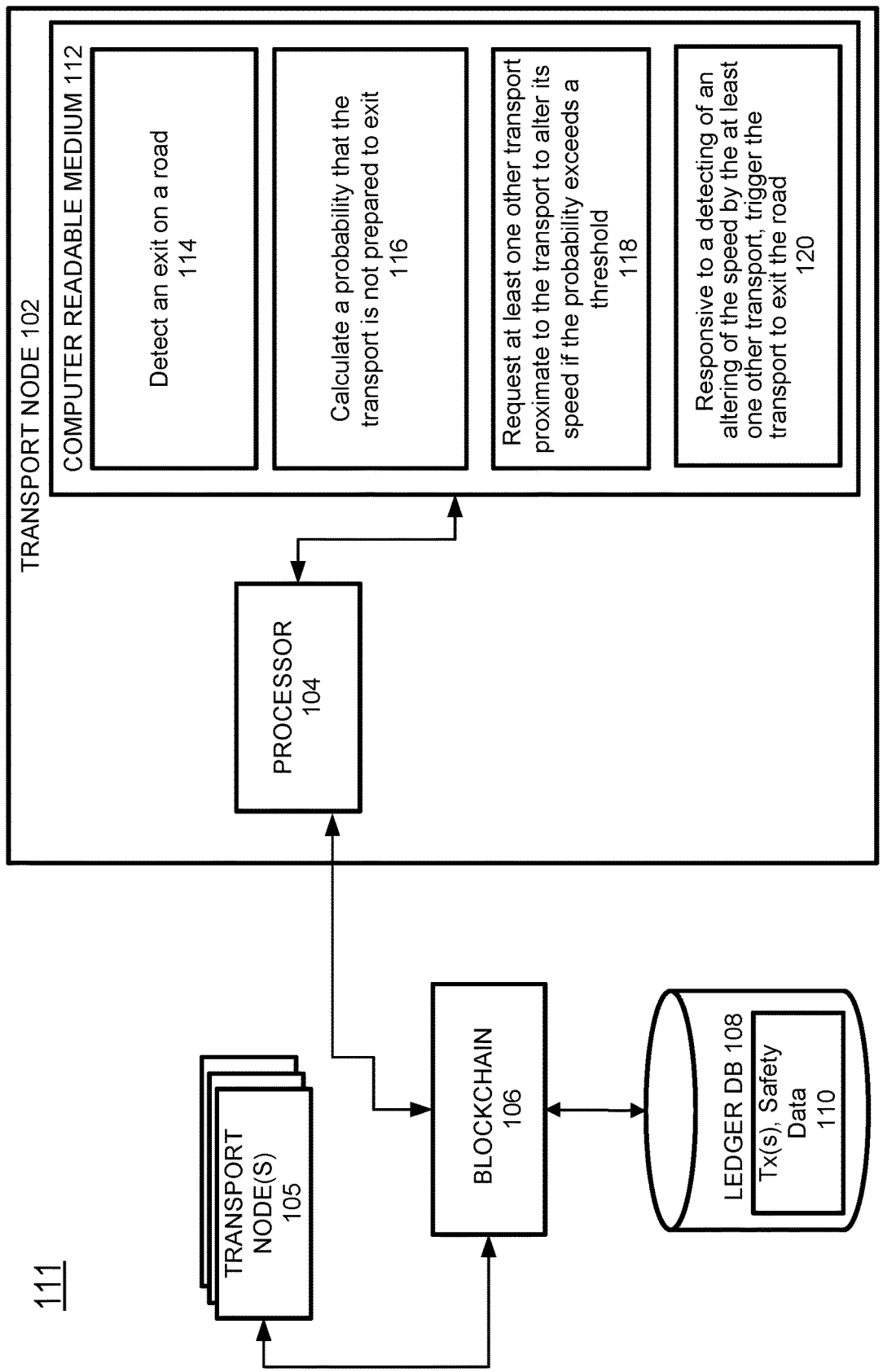
FIG. 1B illustrates an example network diagram including a transport node, according to example embodiments.
Figure 1C:
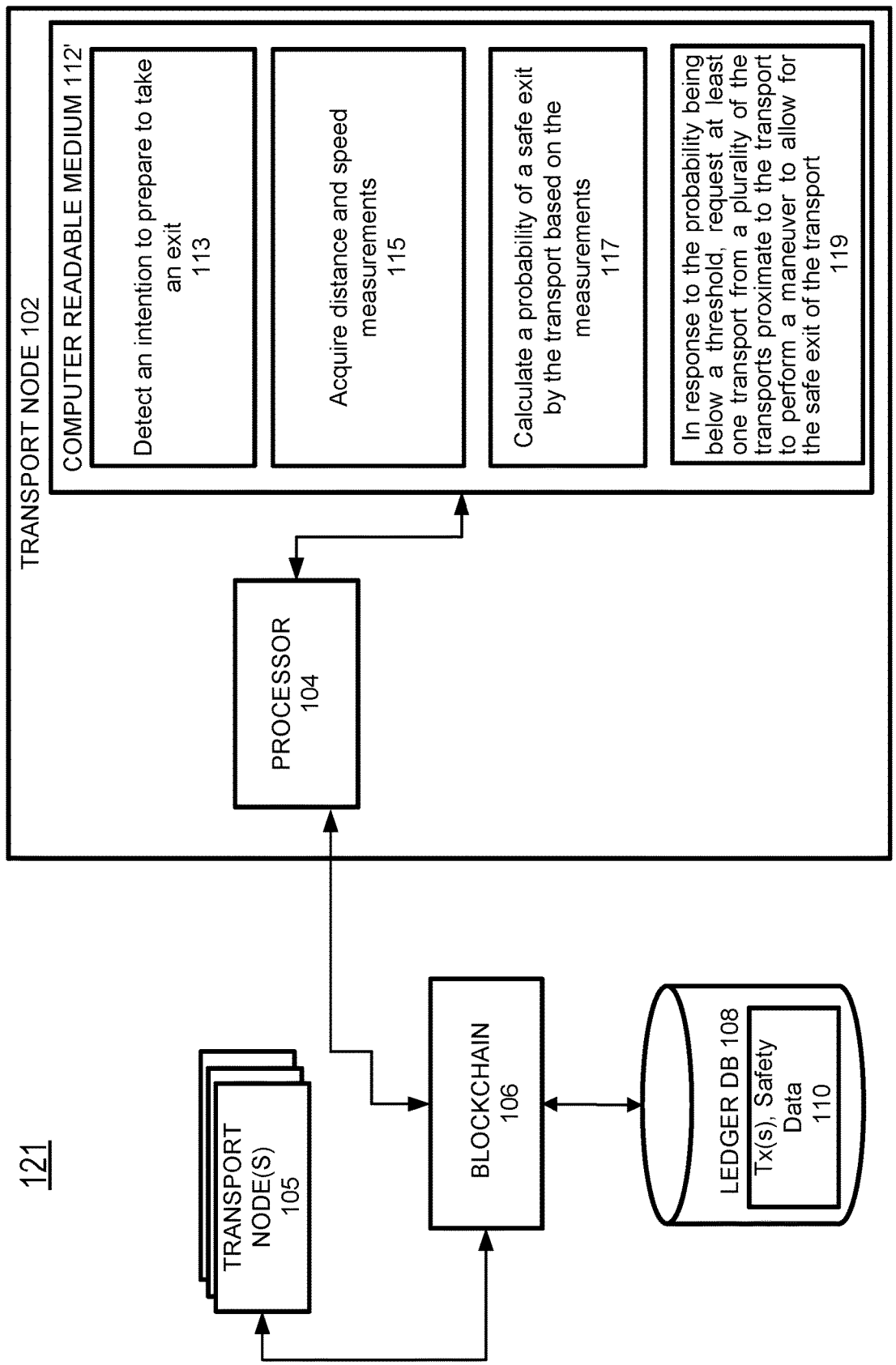
FIG. 1C illustrates another example network diagram including a transport node, according to example embodiments.
Figure 1D:
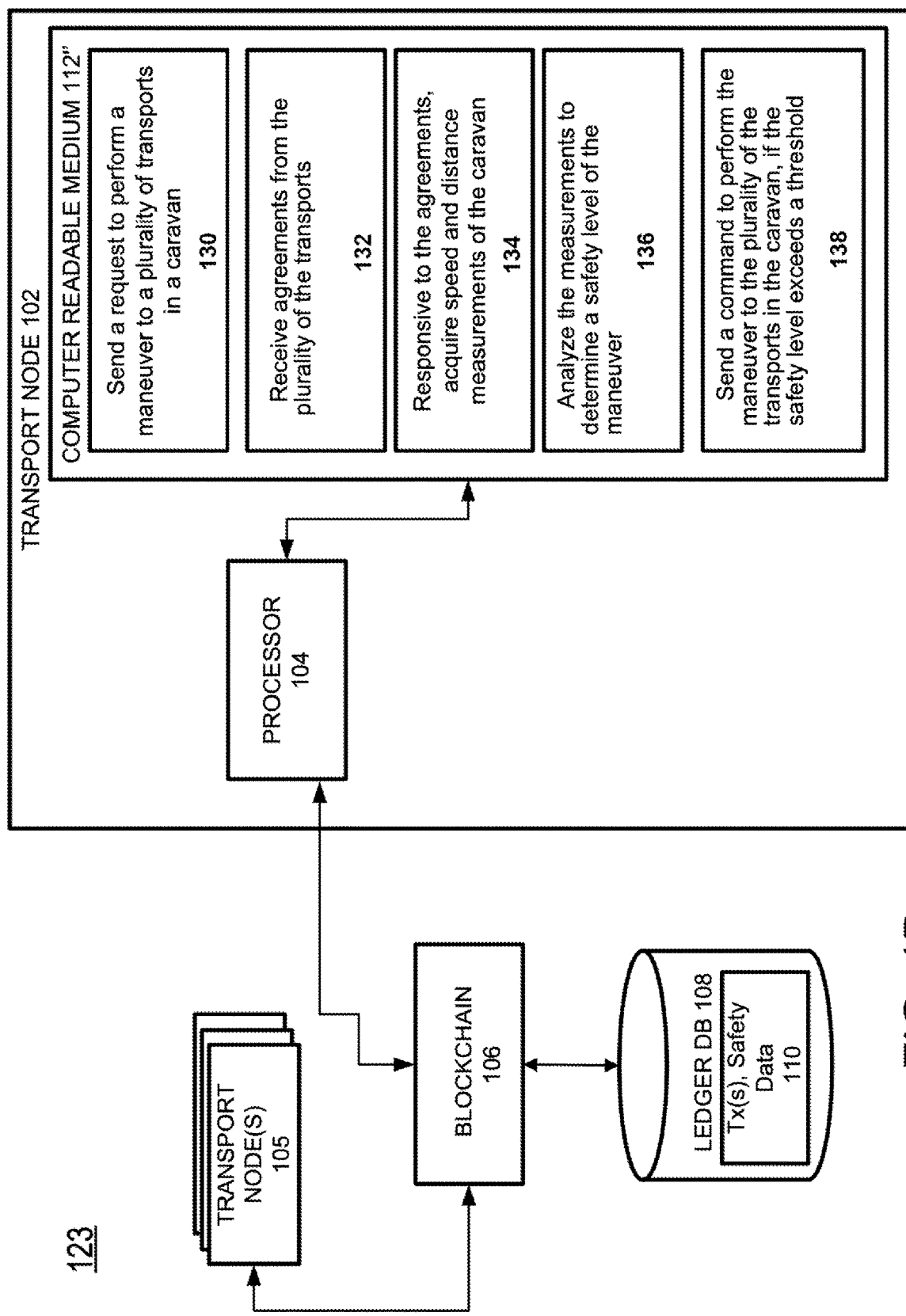
FIG. 1D illustrates yet another example network diagram including a transport node, according to example embodiments.
Figure 1E:
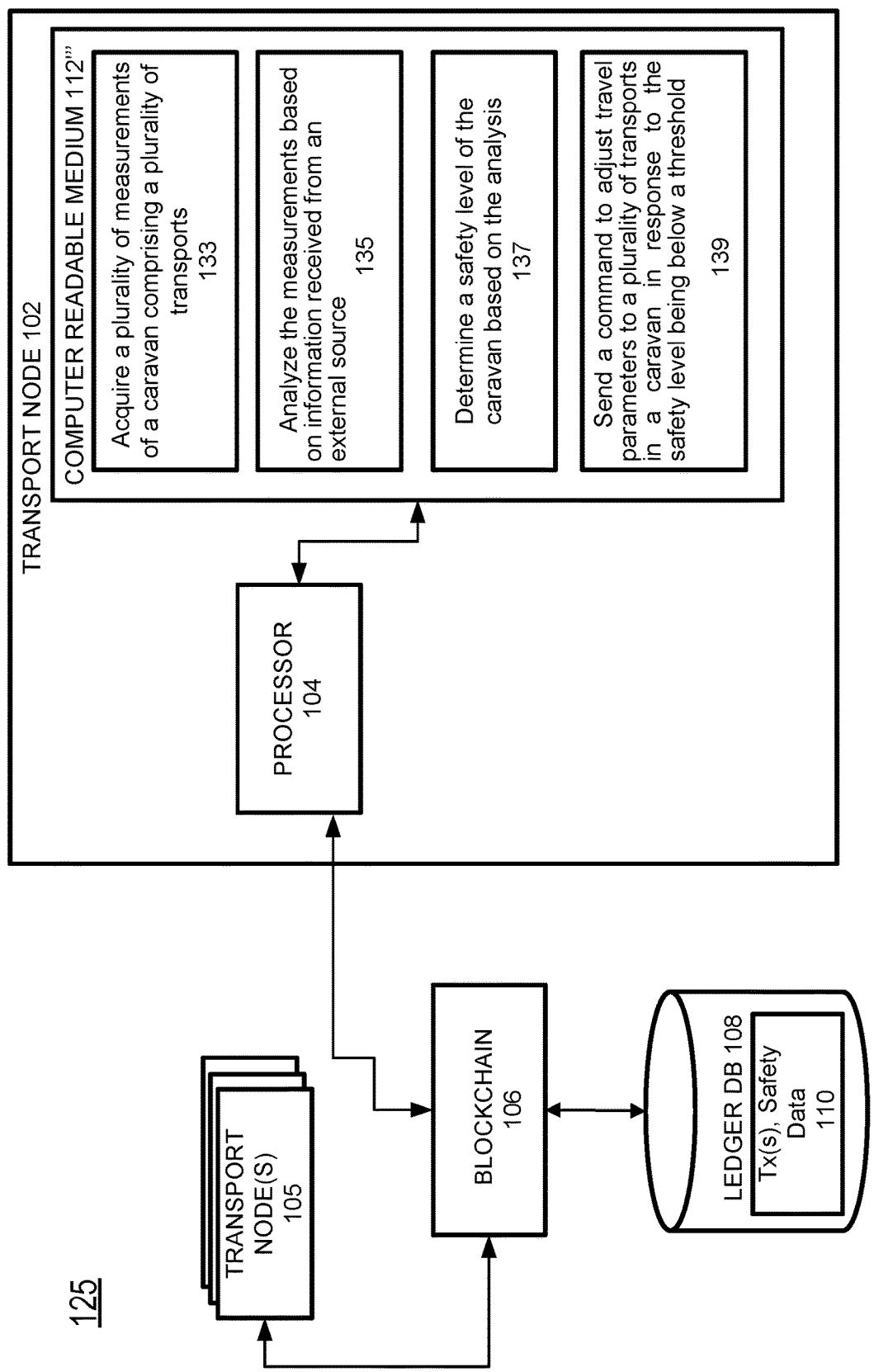
FIG. 1E illustrates a further example network diagram including a transport node, according to example embodiments.
Figure 1F:
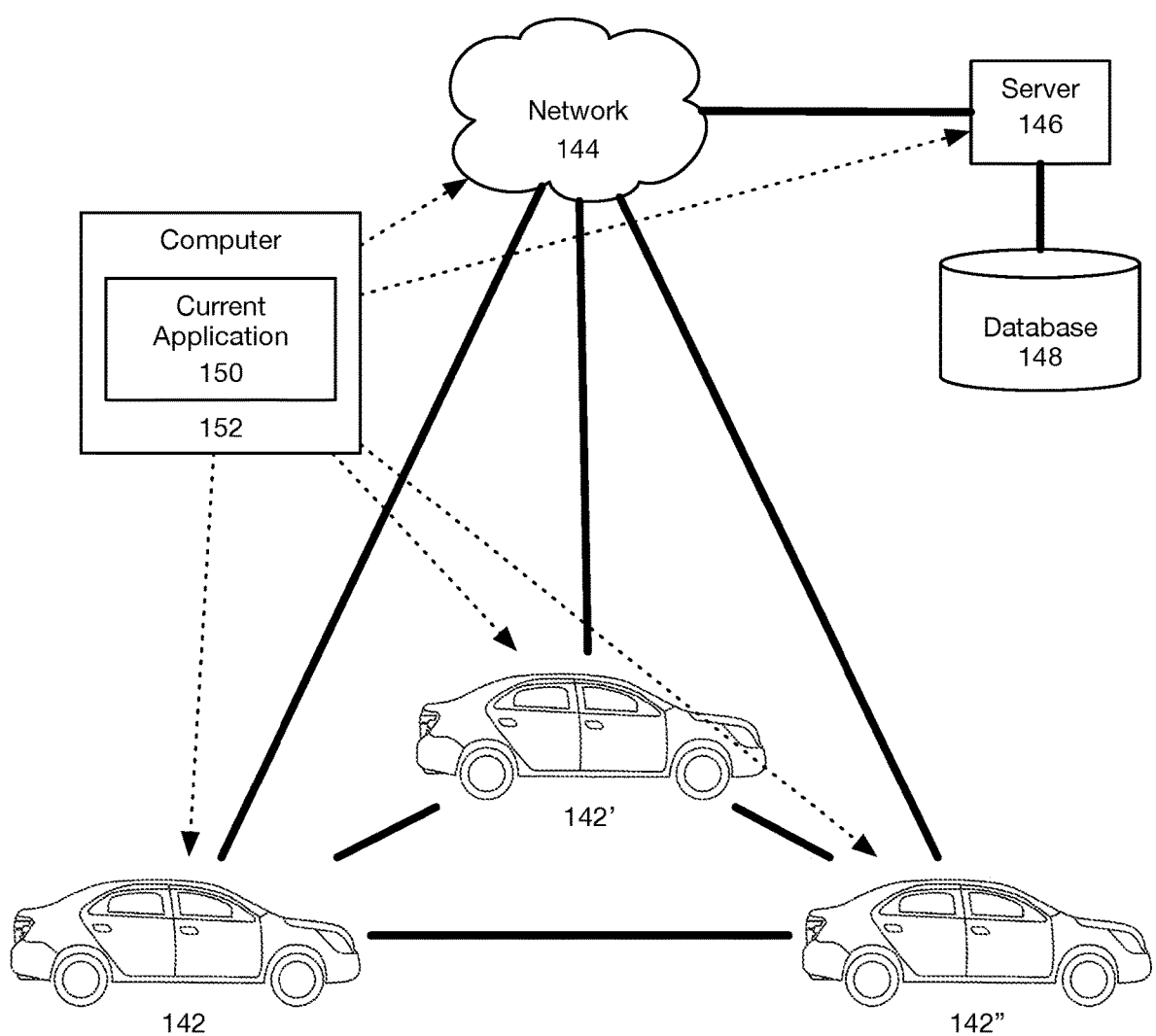
Figure 1G:
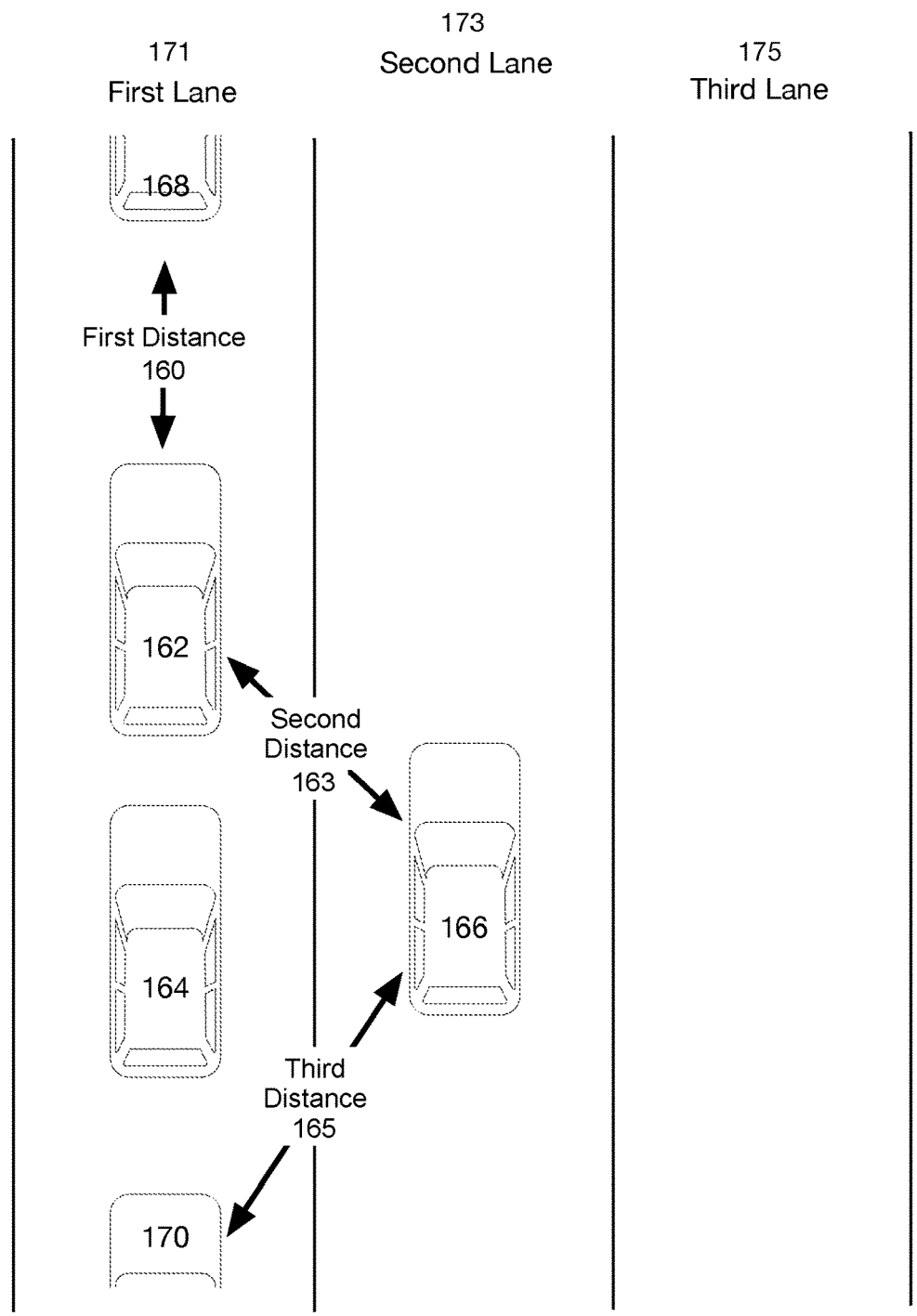

FIG. 1G illustrates an example diagram of transports on a road, according to example embodiments.

Figure 1H:
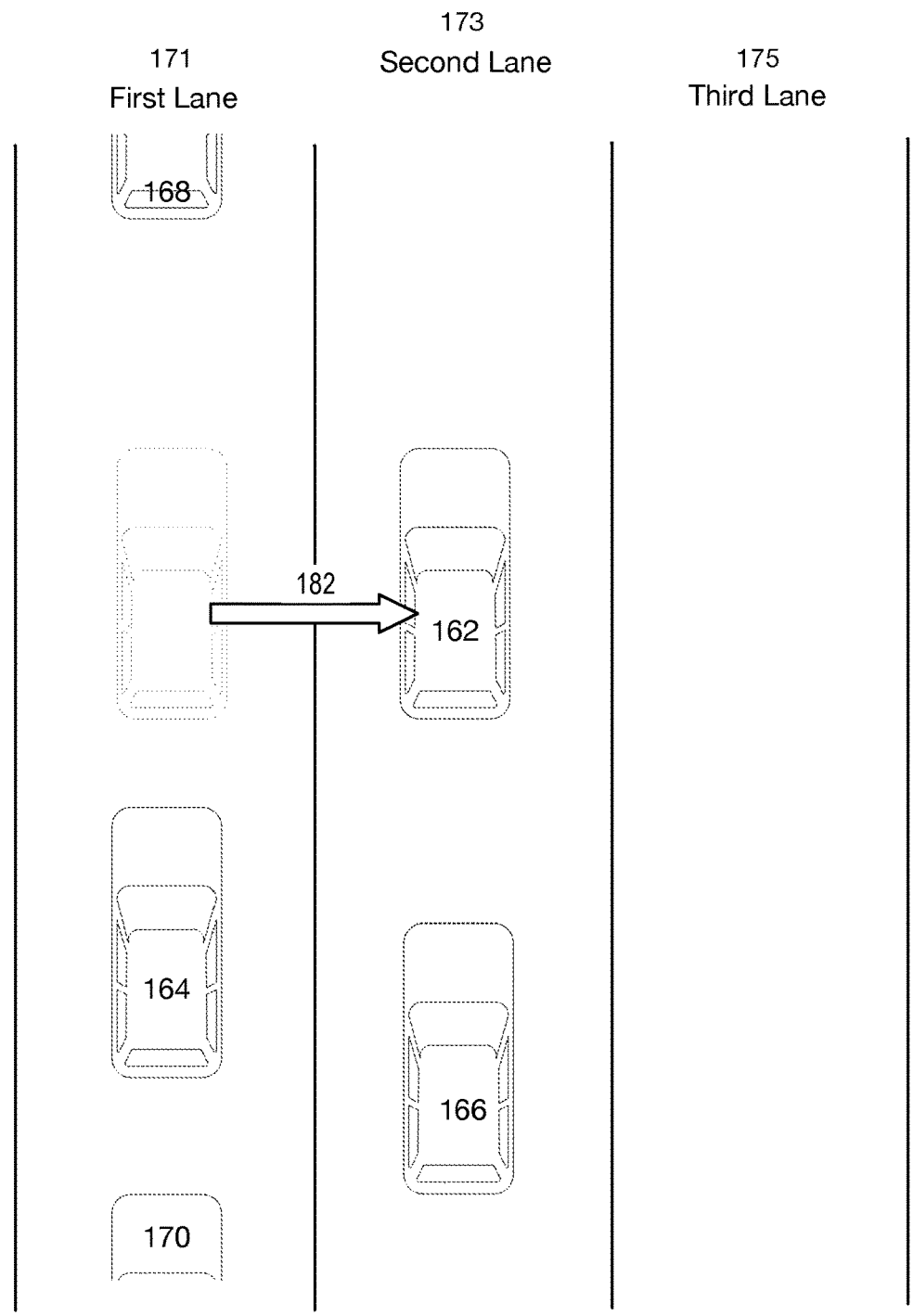

FIG. 1H illustrates another example diagram of transports on a road, according to example embodiments.

Figure 1I:
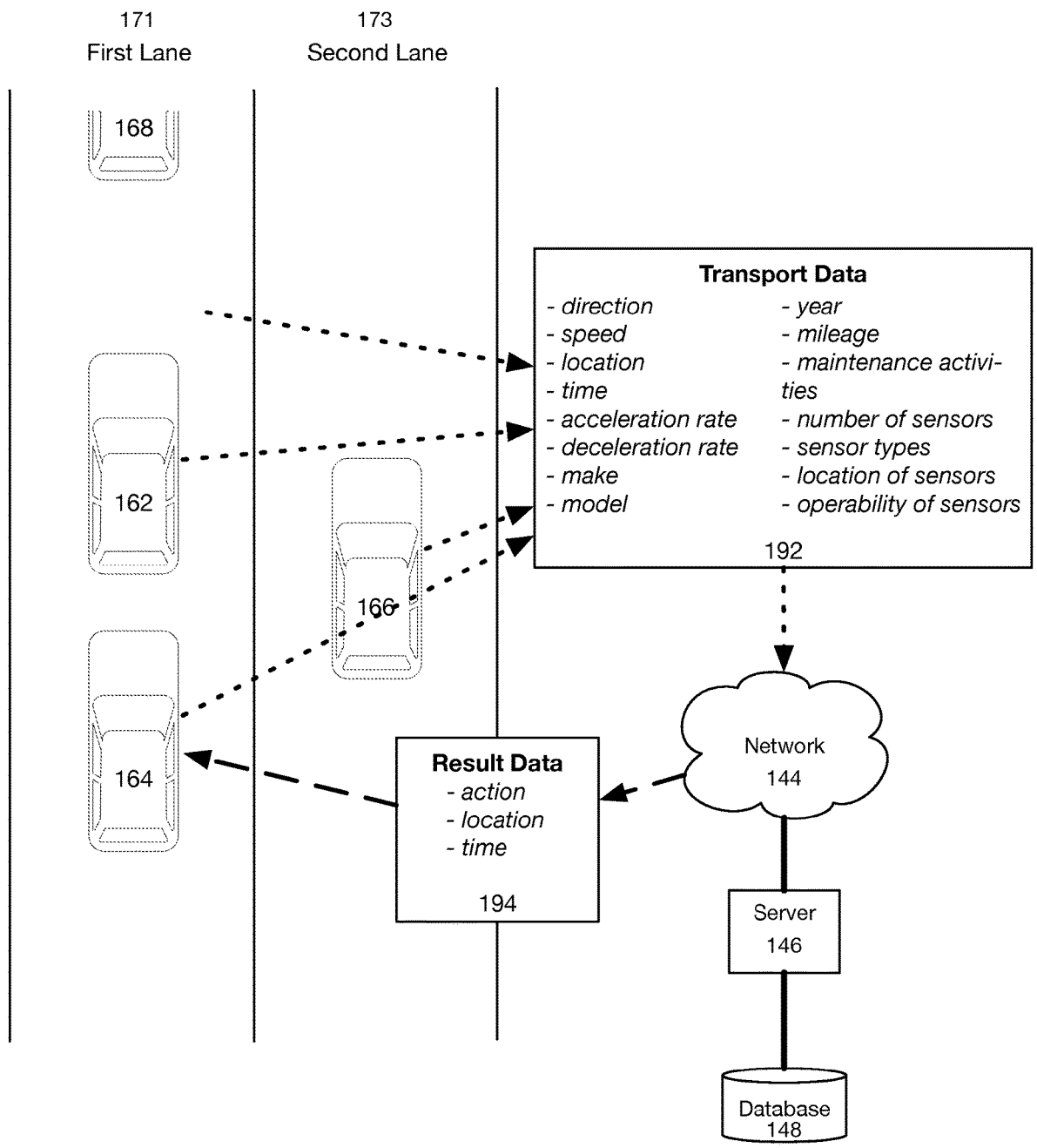

FIG. 1I illustrates a further example diagram of transports on a road, according to example embodiments.

Figure 1J:
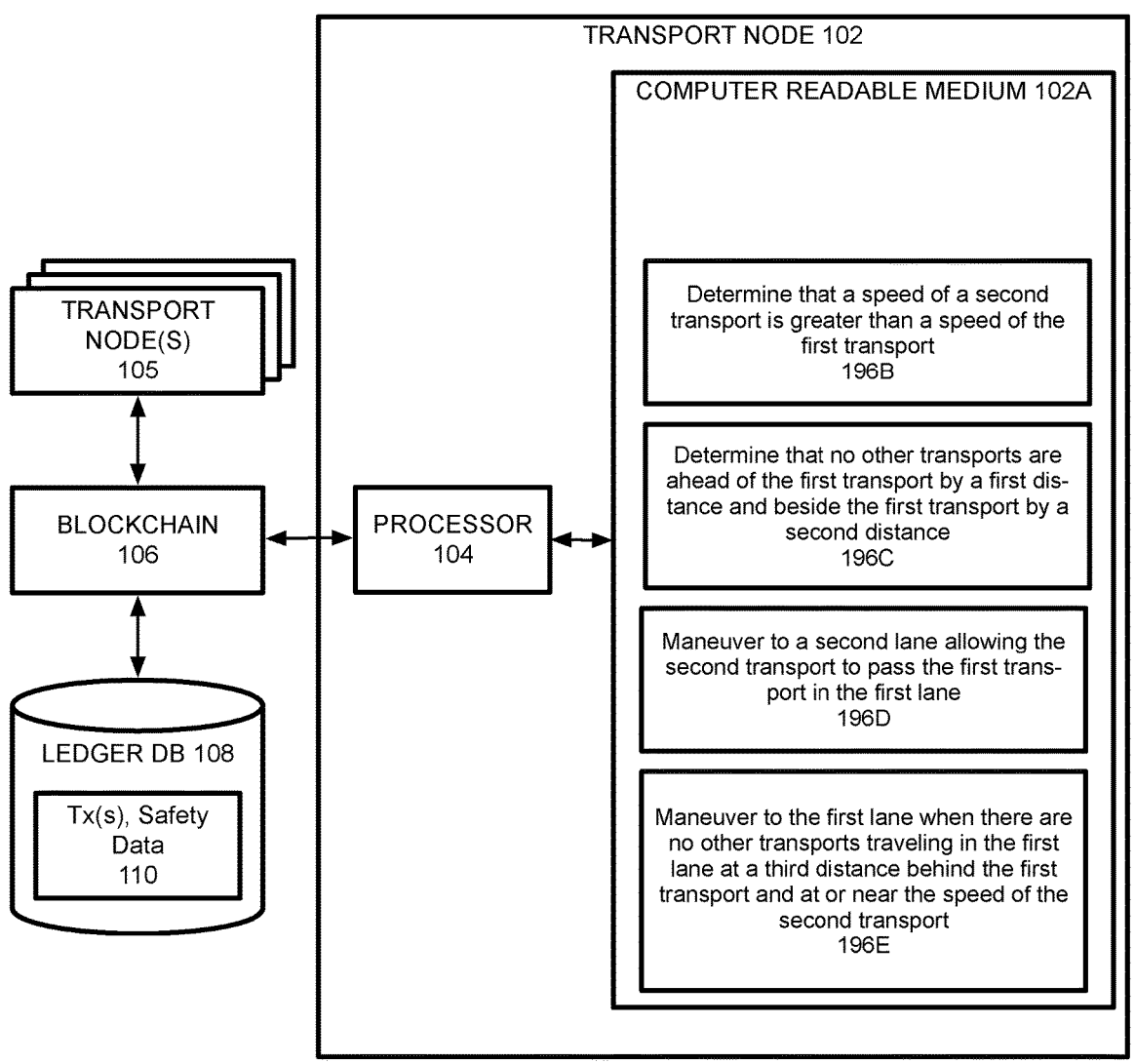

FIG. 1J illustrates yet a further example network diagram including a transport node, according to example embodiments.

Figure 1K:
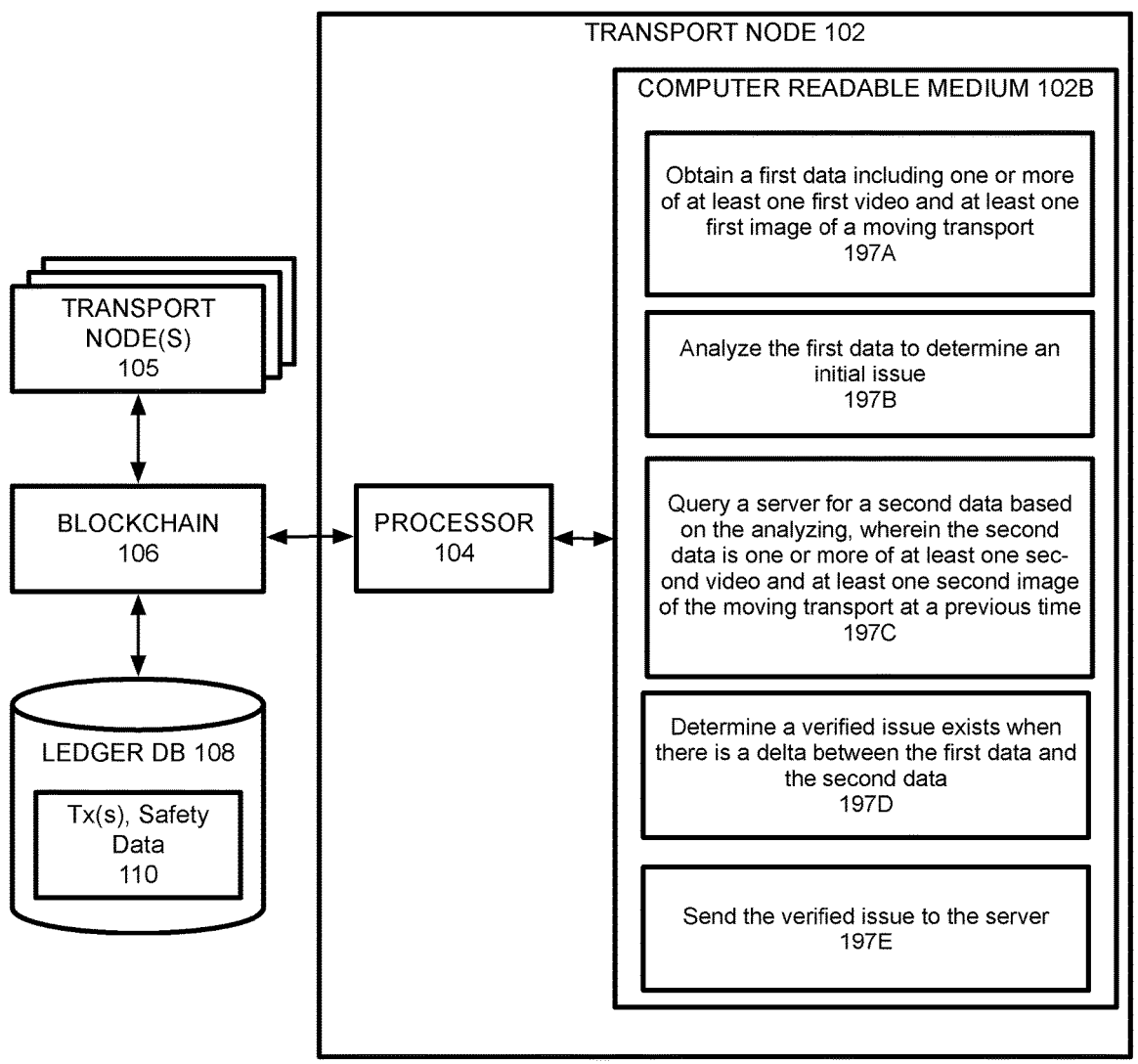

FIG. 1K illustrates yet a further example network diagram including a transport node, according to example embodiments.

Figure 2A:
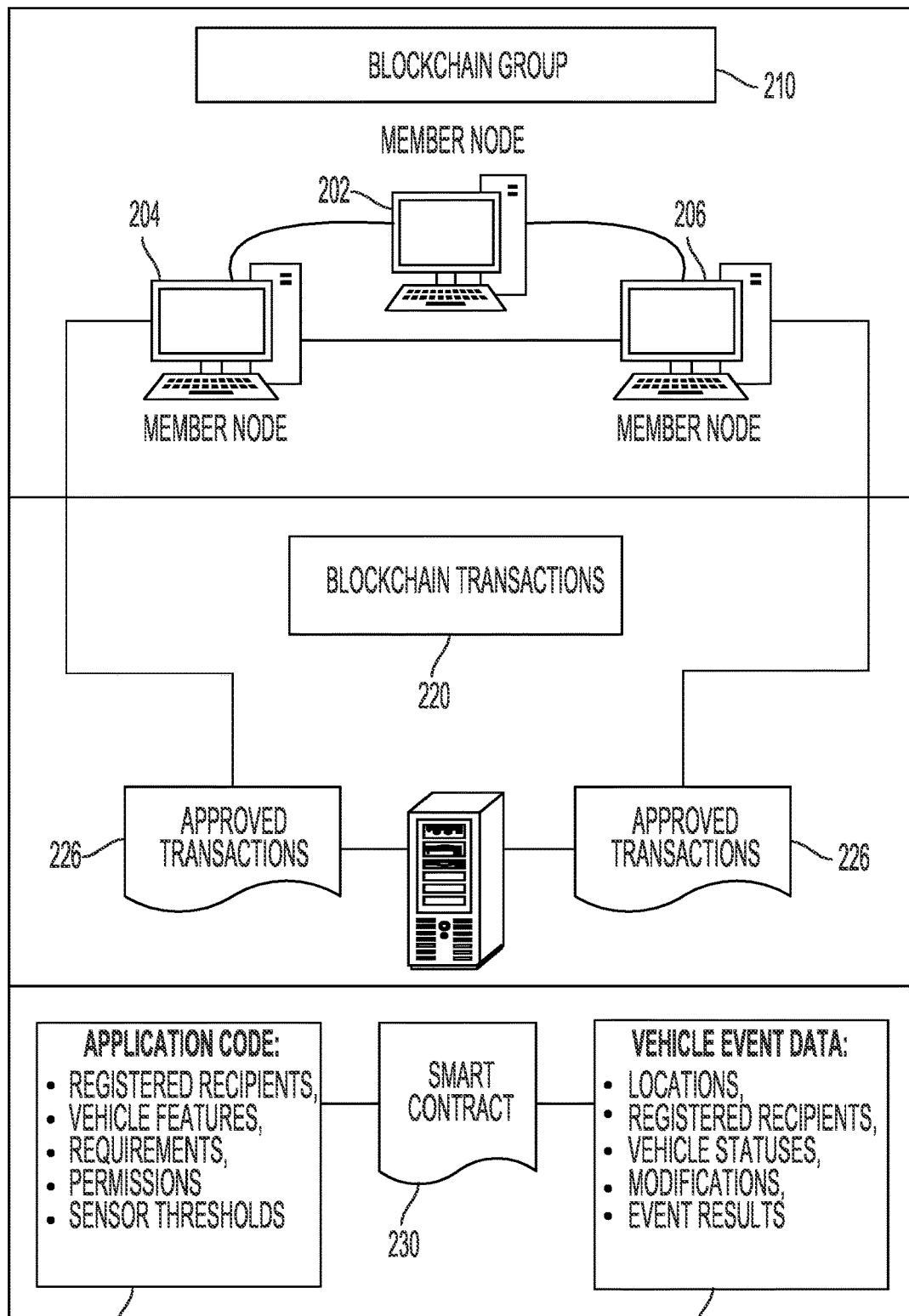

FIG. 2A illustrates a blockchain architecture configuration, according to example embodiments.

Figure 2B:
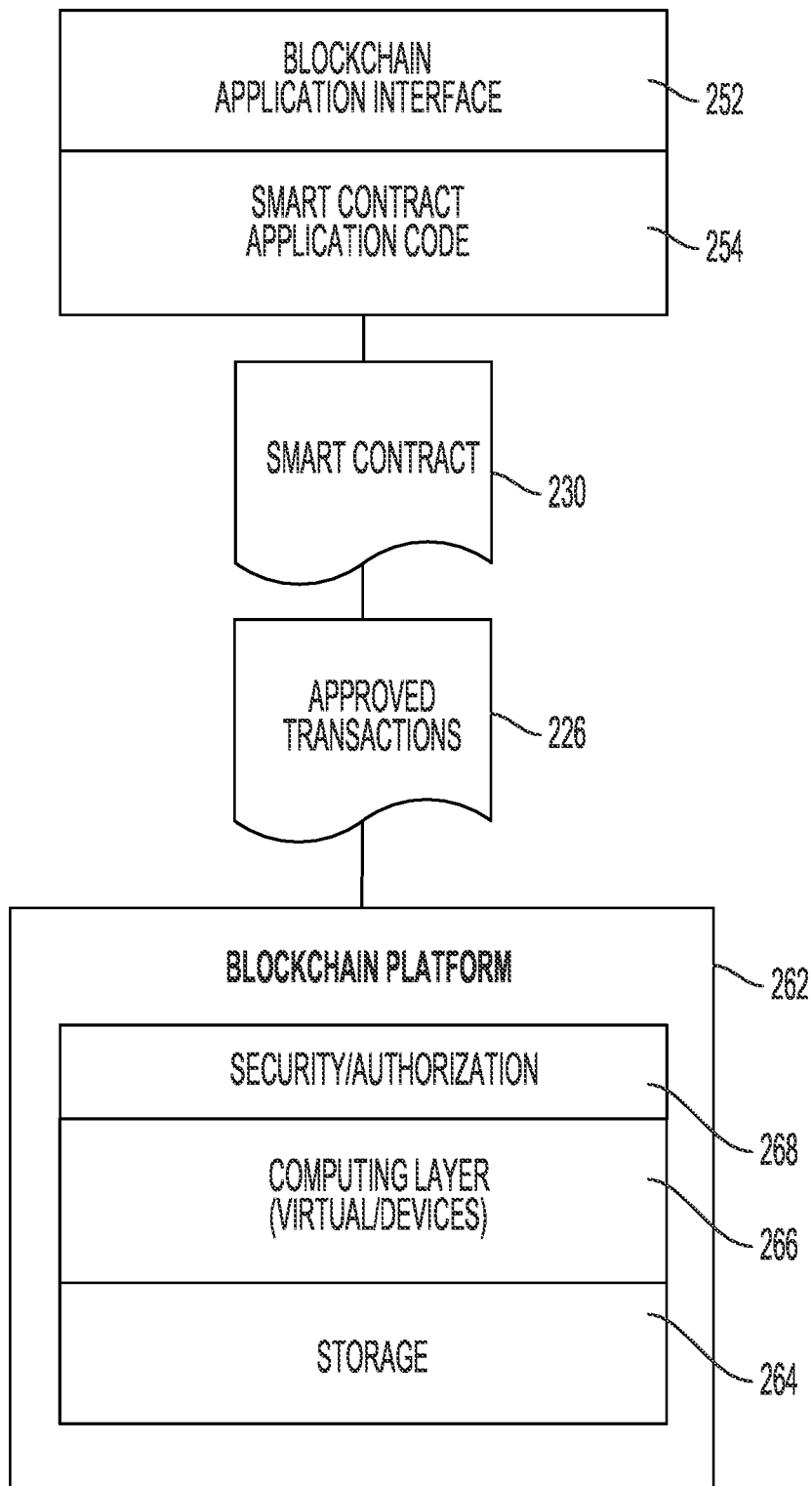

FIG. 2B illustrates another blockchain configuration, according to example embodiments.

Figure 2C:
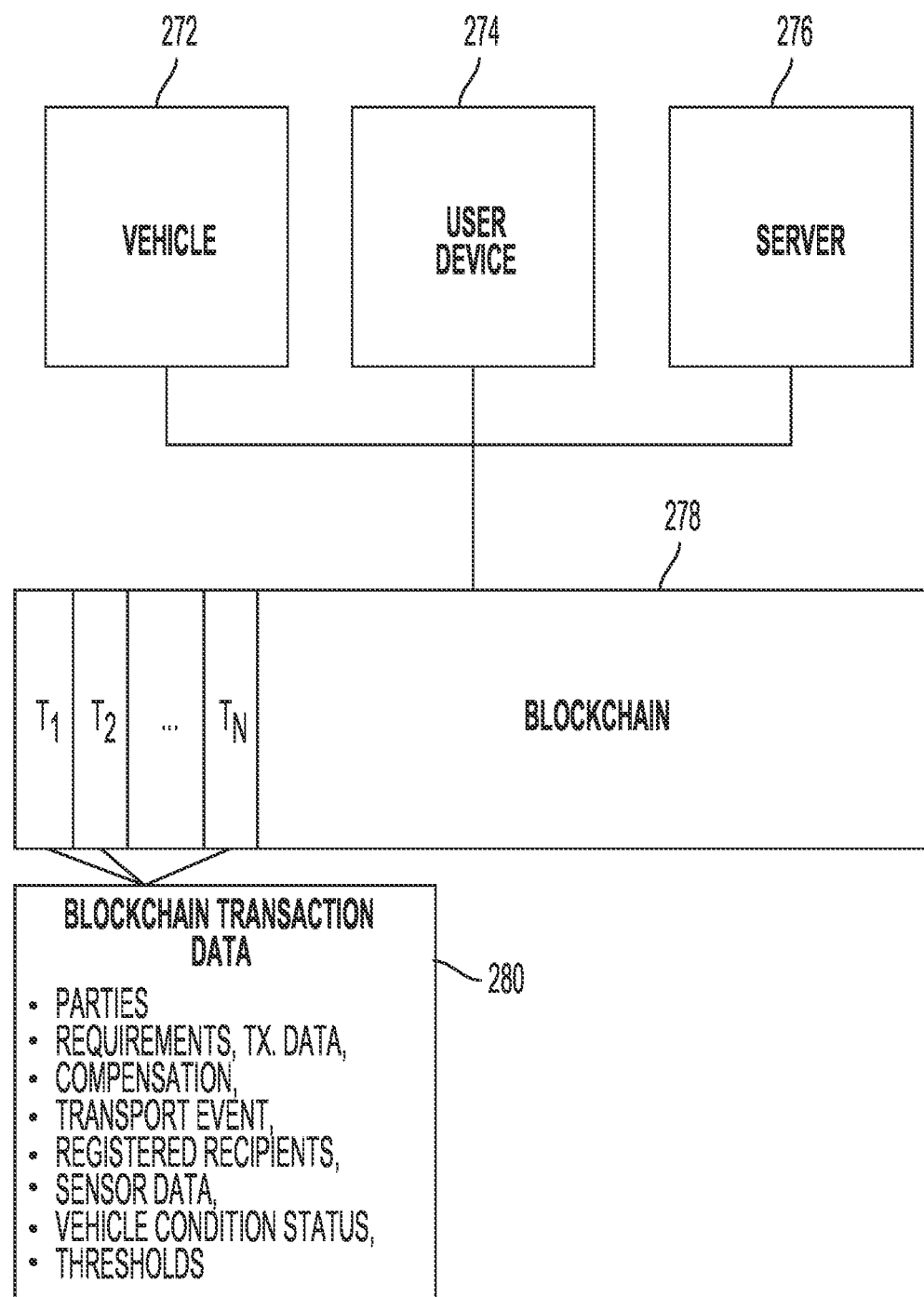

FIG. 2C illustrates a blockchain configuration for storing blockchain transaction data, according to example embodiments.

Figure 3A:
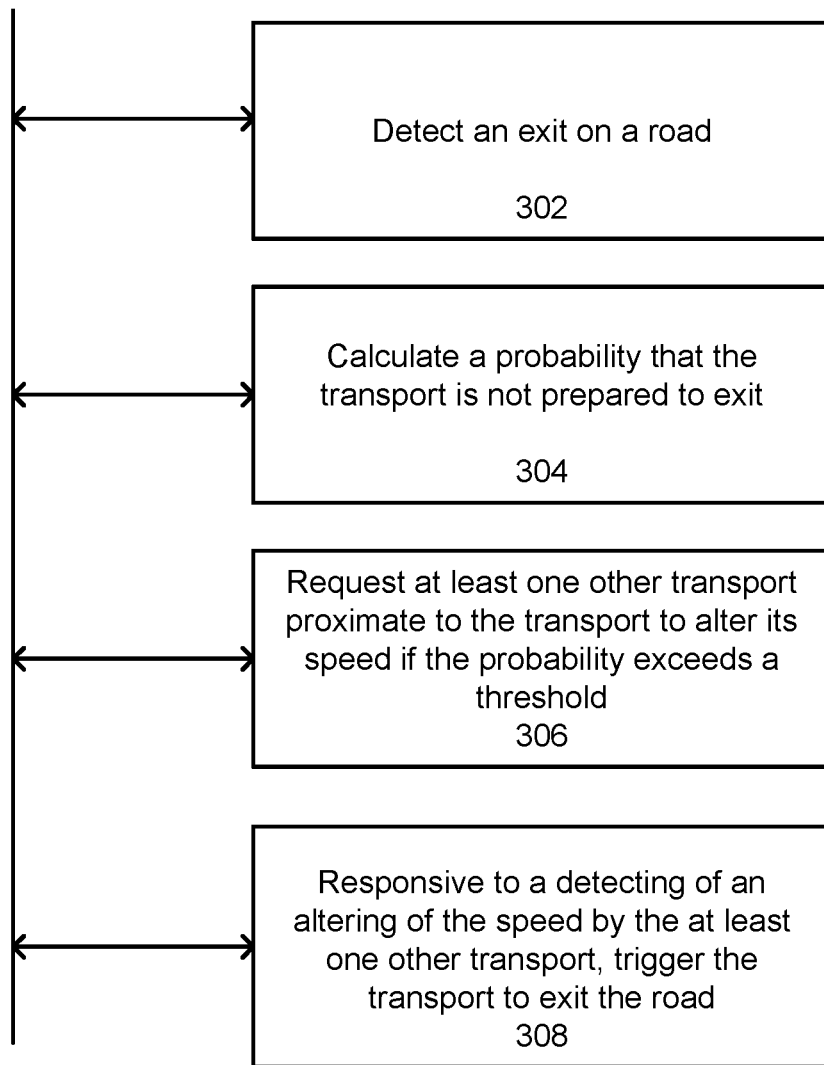

FIG. 3A illustrates a flow diagram, according to example embodiments.

Figure 3B:
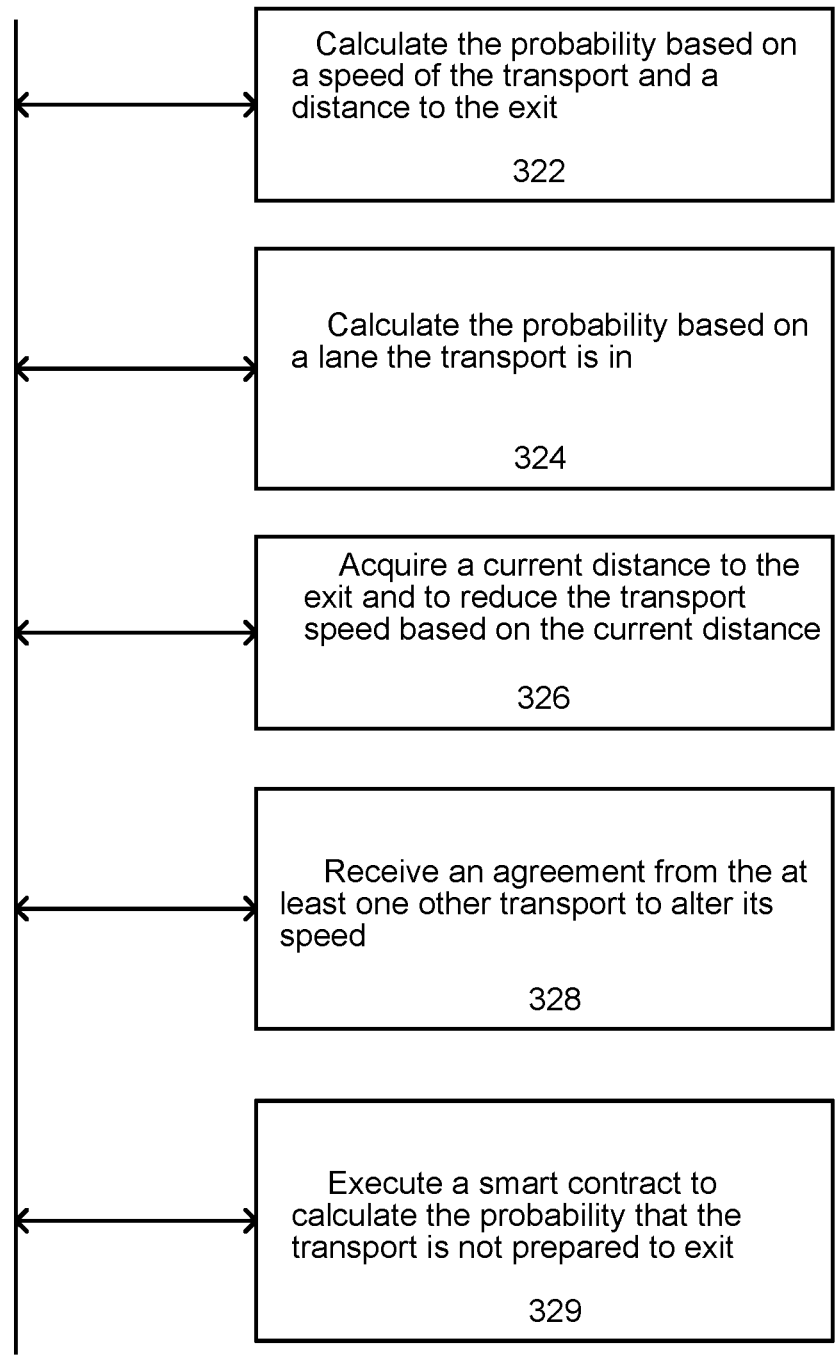

FIG. 3B illustrates another flow diagram, according to example embodiments.

Figure 3C:
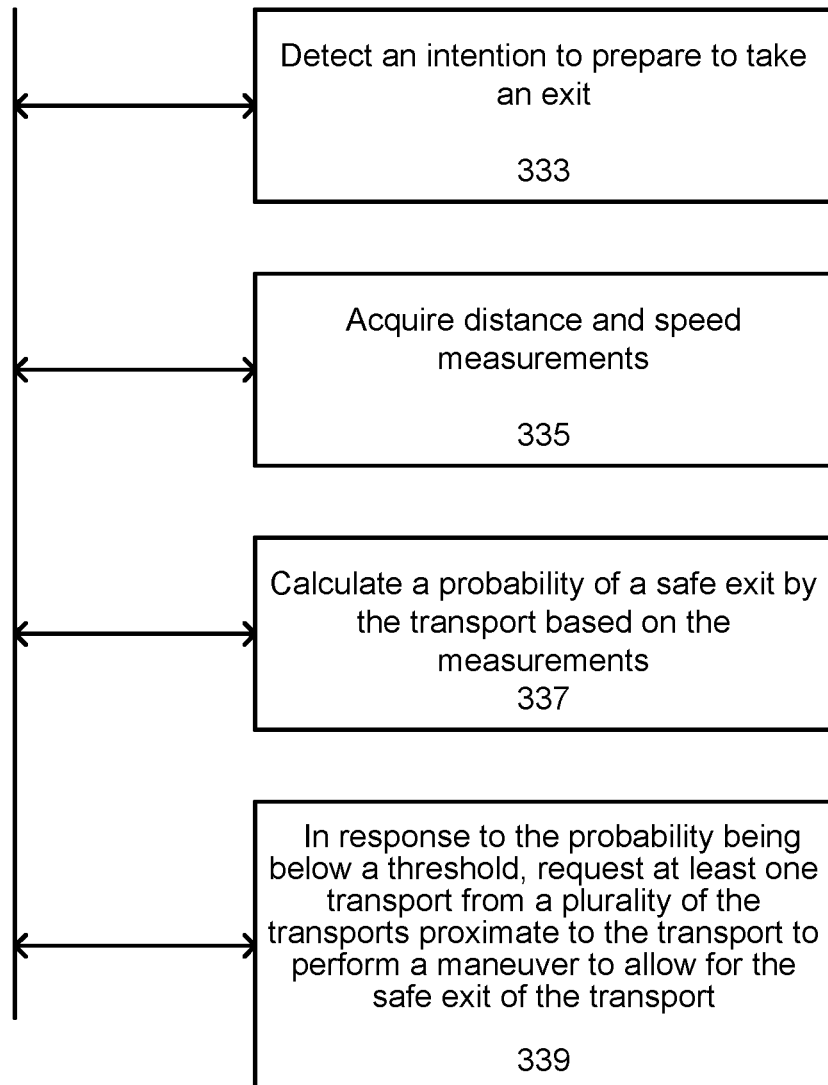

FIG. 3C illustrates a further flow diagram, according to example embodiments.

Figure 3D:
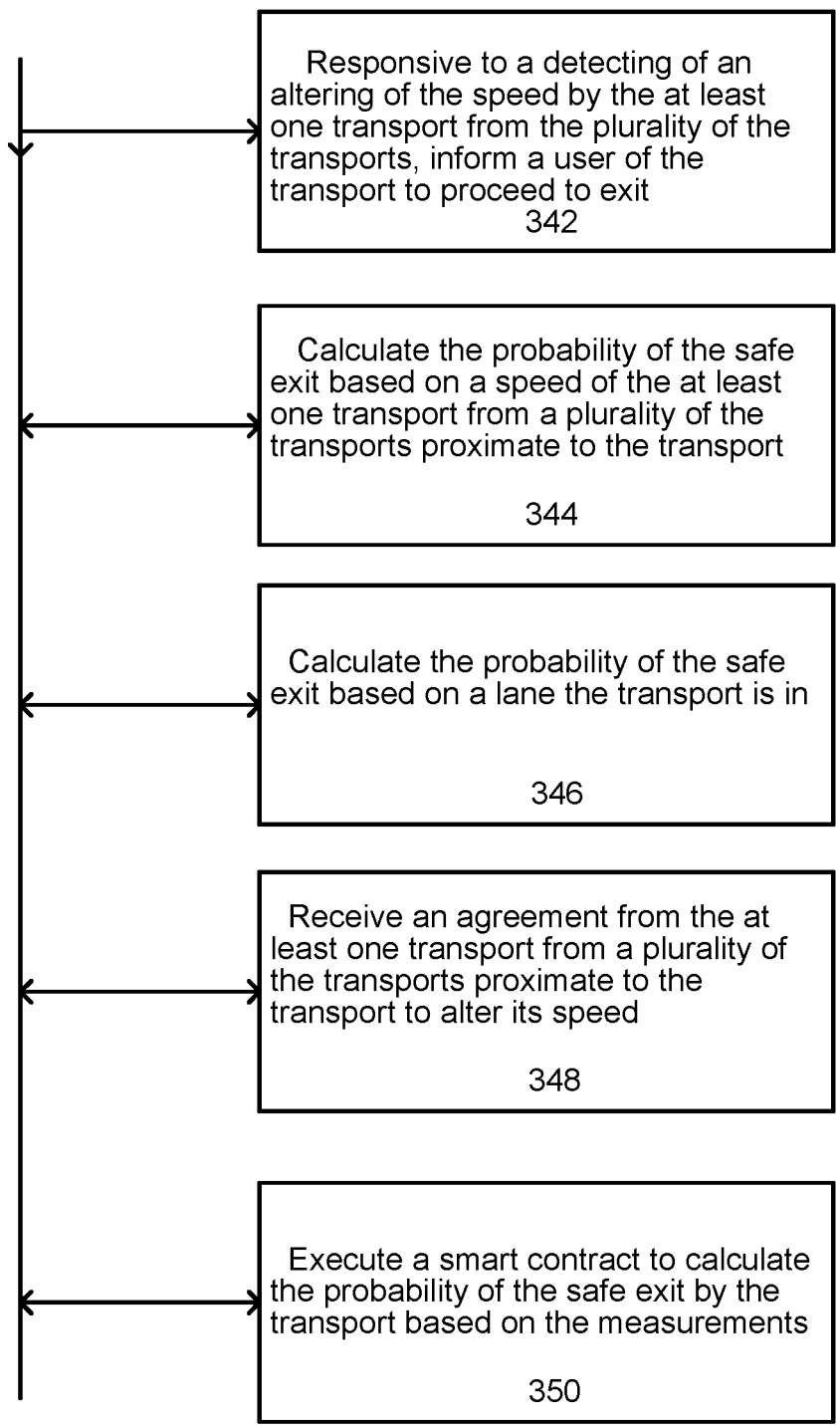

FIG. 3D illustrates yet a further flow diagram, according to example embodiments.

Figure 3E:
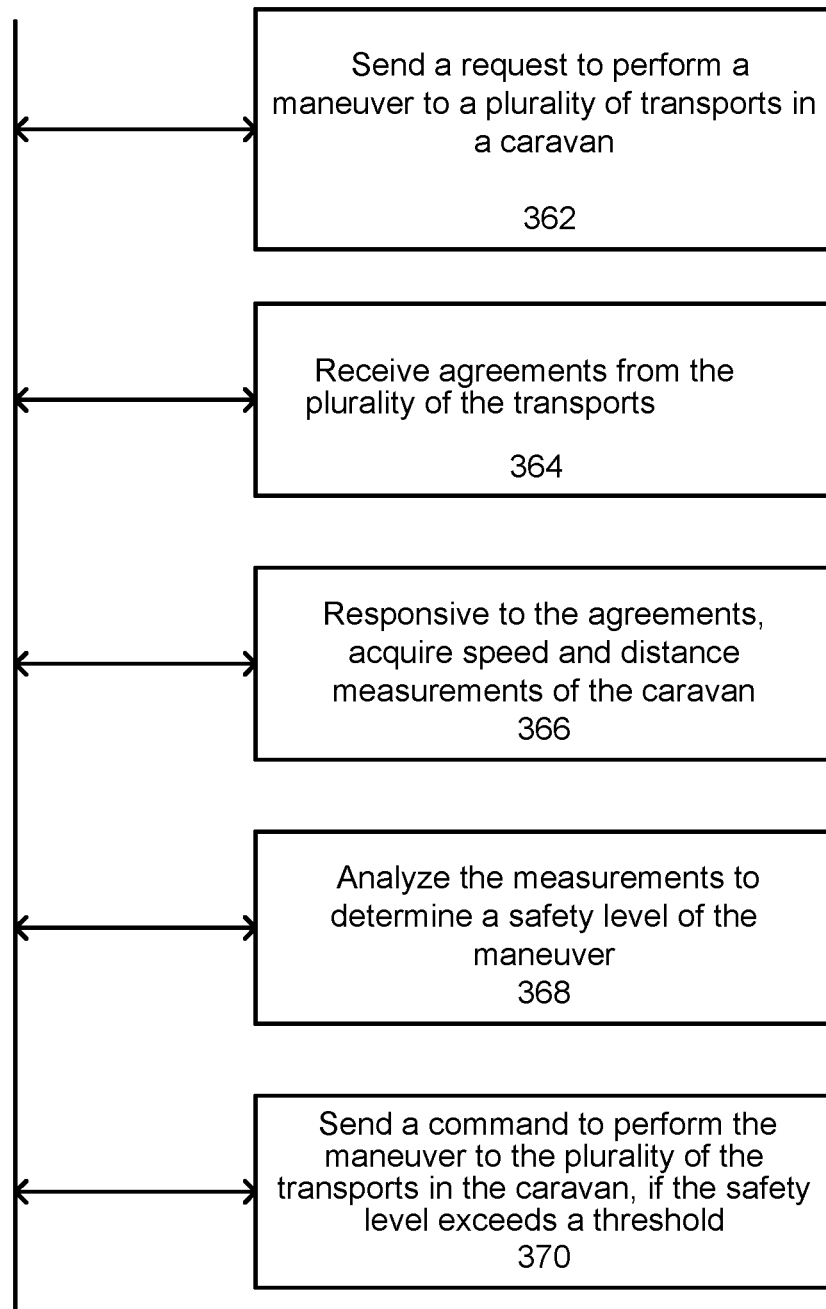

FIG. 3E illustrates a further flow diagram, according to example embodiments.

Figure 3F:
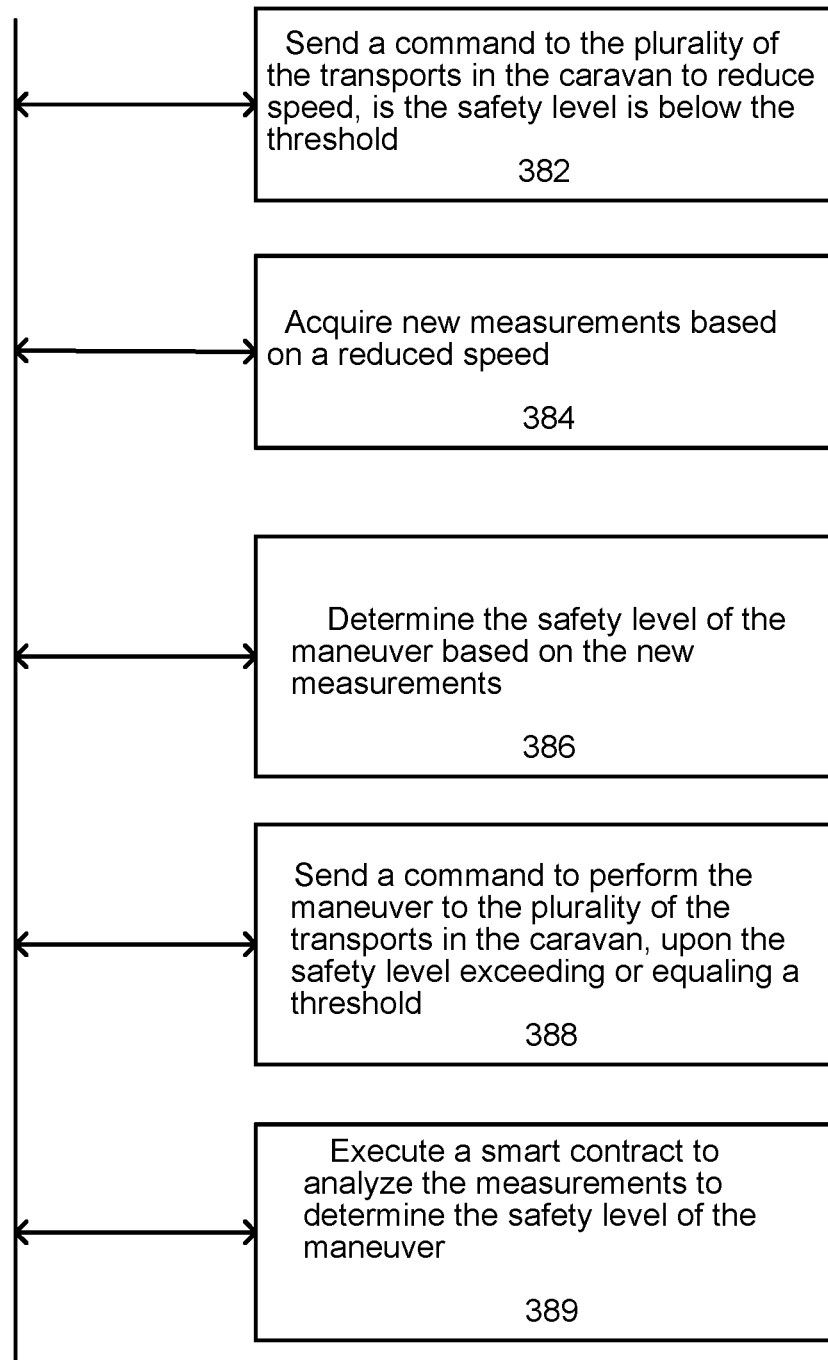

FIG. 3F illustrates yet a further flow diagram, according to example embodiments.

Figure 3G:
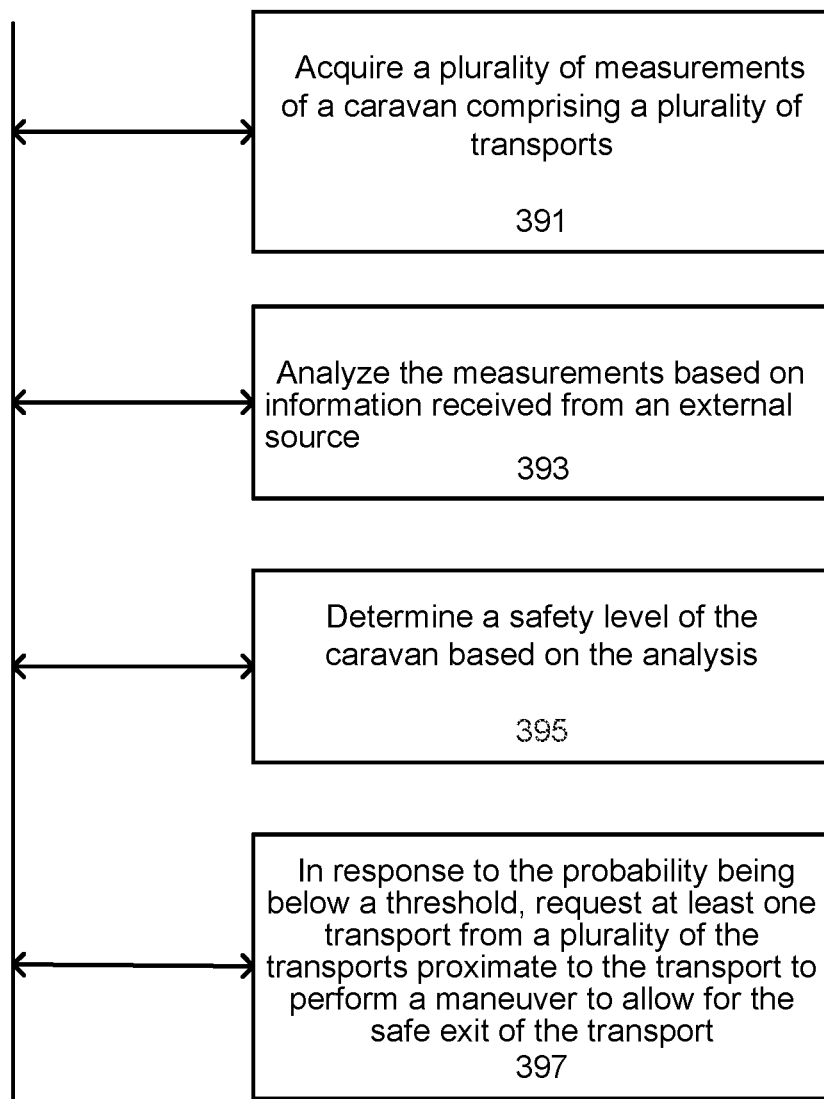

FIG. 3G illustrates a further flow diagram, according to example embodiments.

Figure 3H:
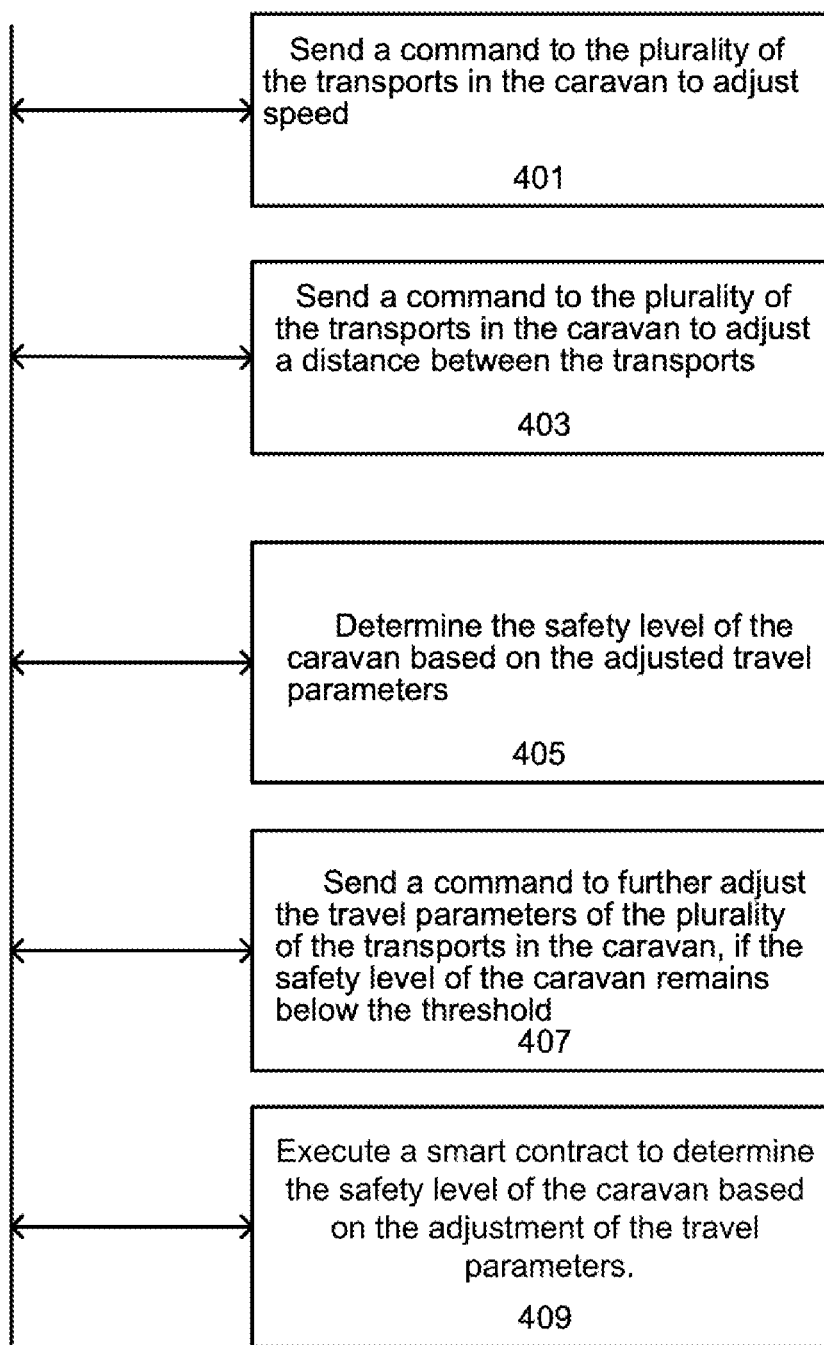
Figure 31:
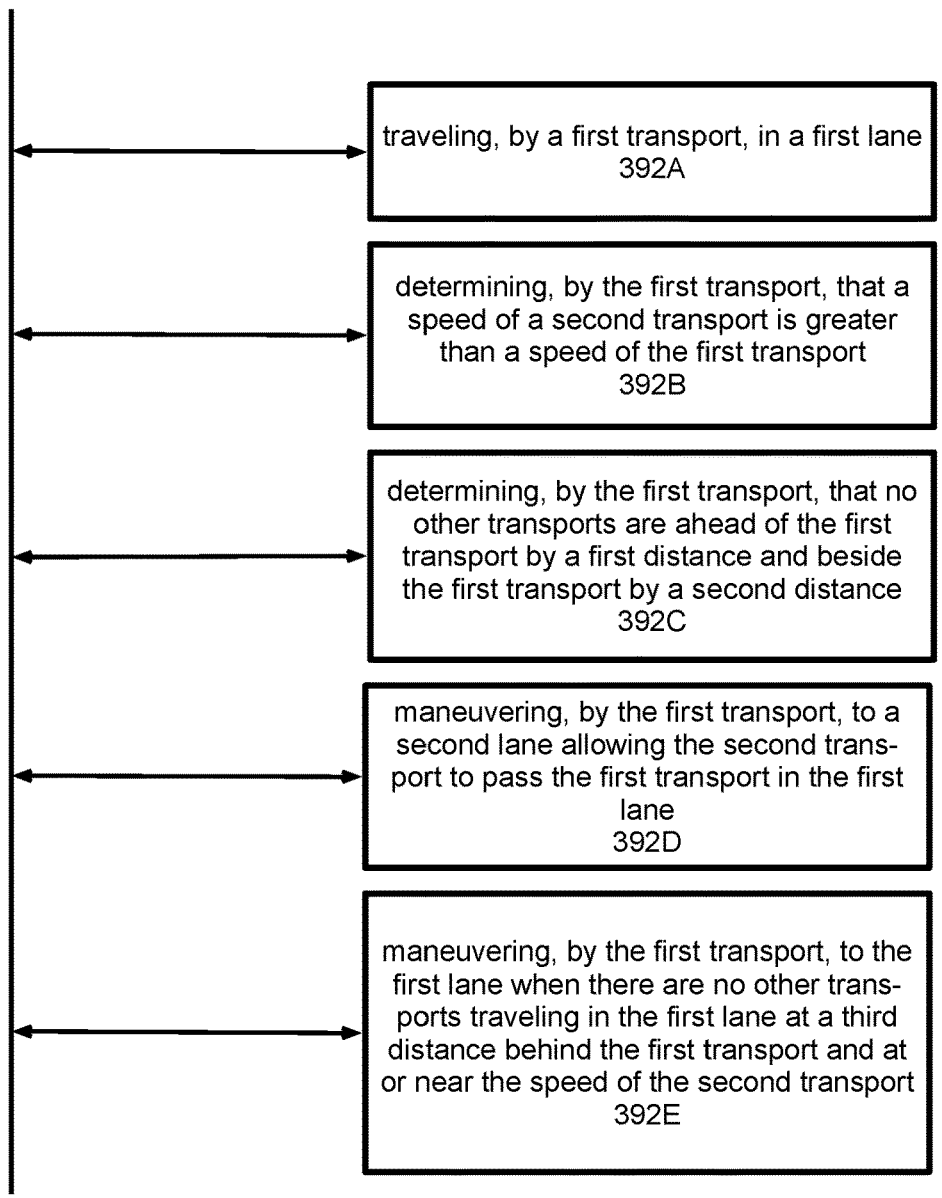

FIG. 3H illustrates yet a further flow diagram, according to example embodiments.

FIG. 3I illustrates yet a further flow diagram according to example embodiments.

Figure 3J:
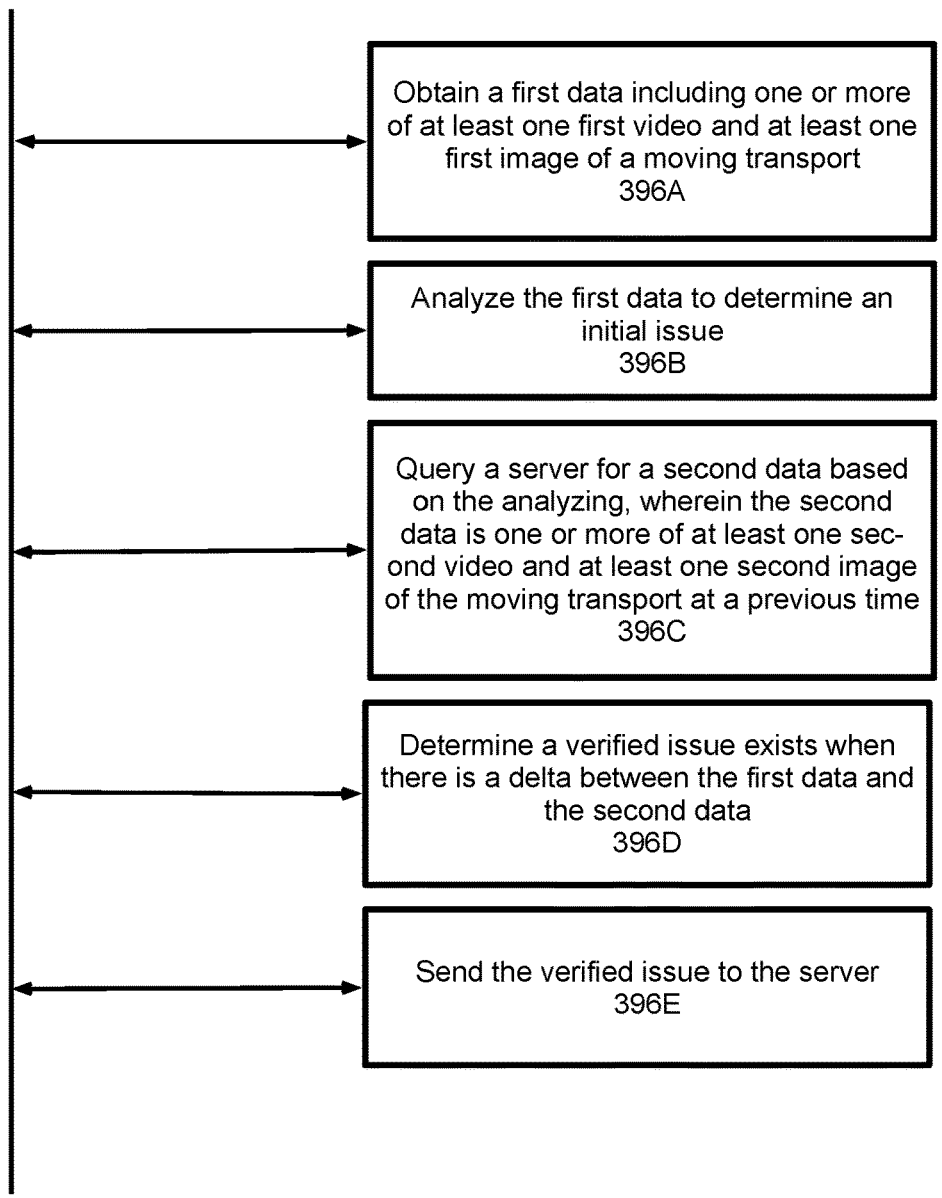

FIG. 3J illustrates yet a further flow diagram according to example embodiments.

Figure 4A:
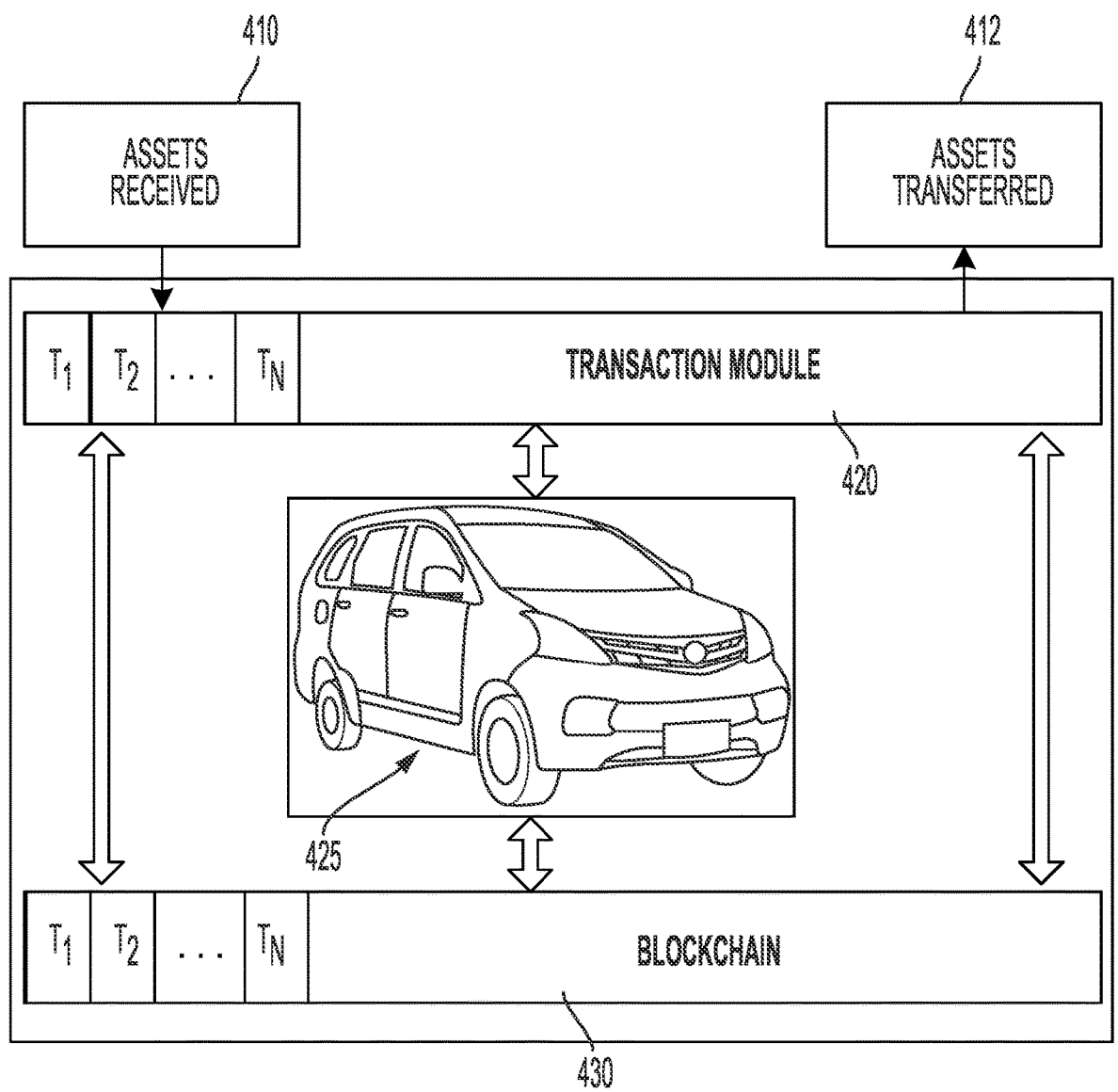

FIG. 4A illustrates an example blockchain vehicle configuration for managing blockchain transactions associated with a vehicle, according to example embodiments.

Figure 4B:
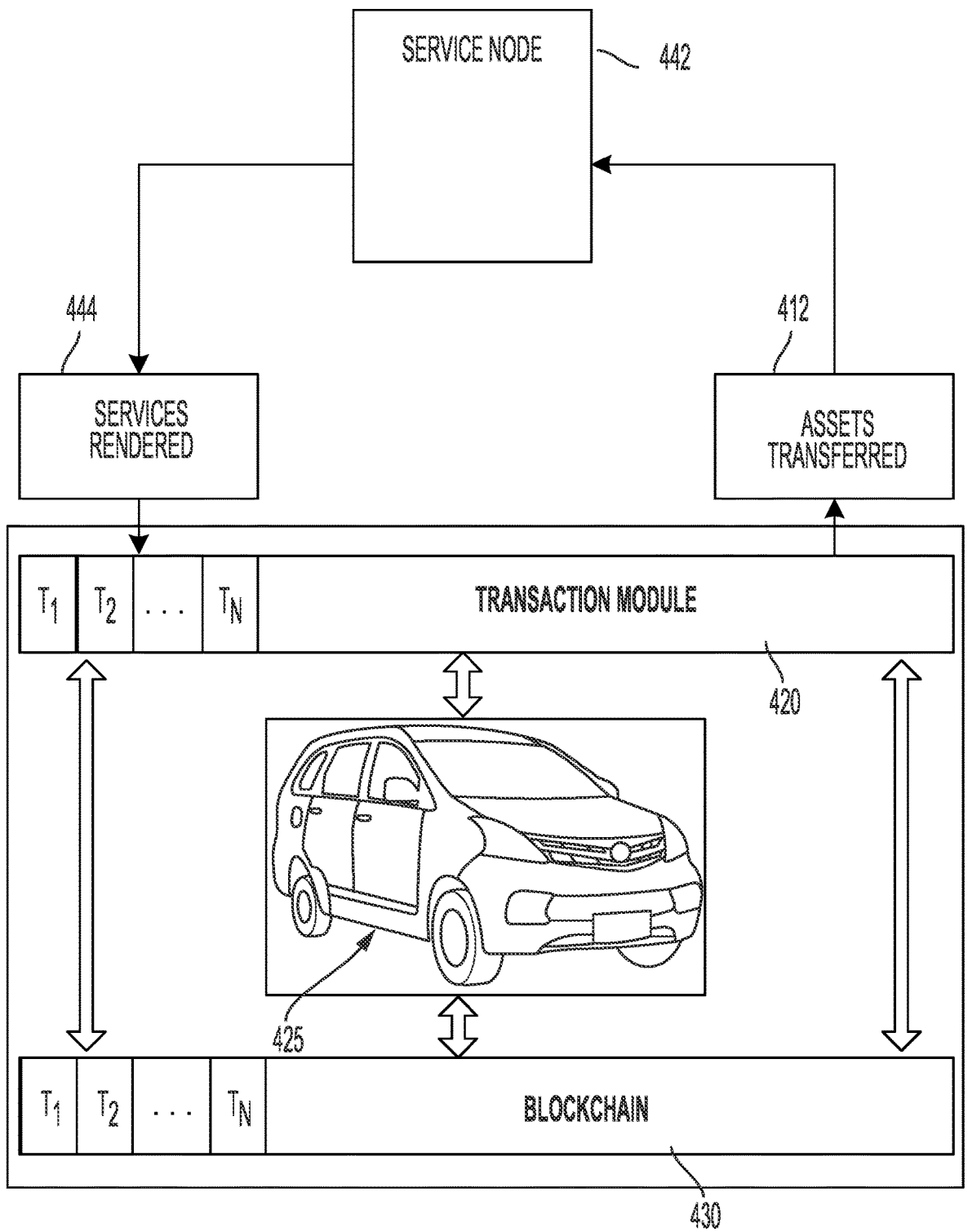

FIG. 4B illustrates another example blockchain vehicle configuration for managing blockchain transactions between a service center and a vehicle, according to example embodiments.

Figure 5:
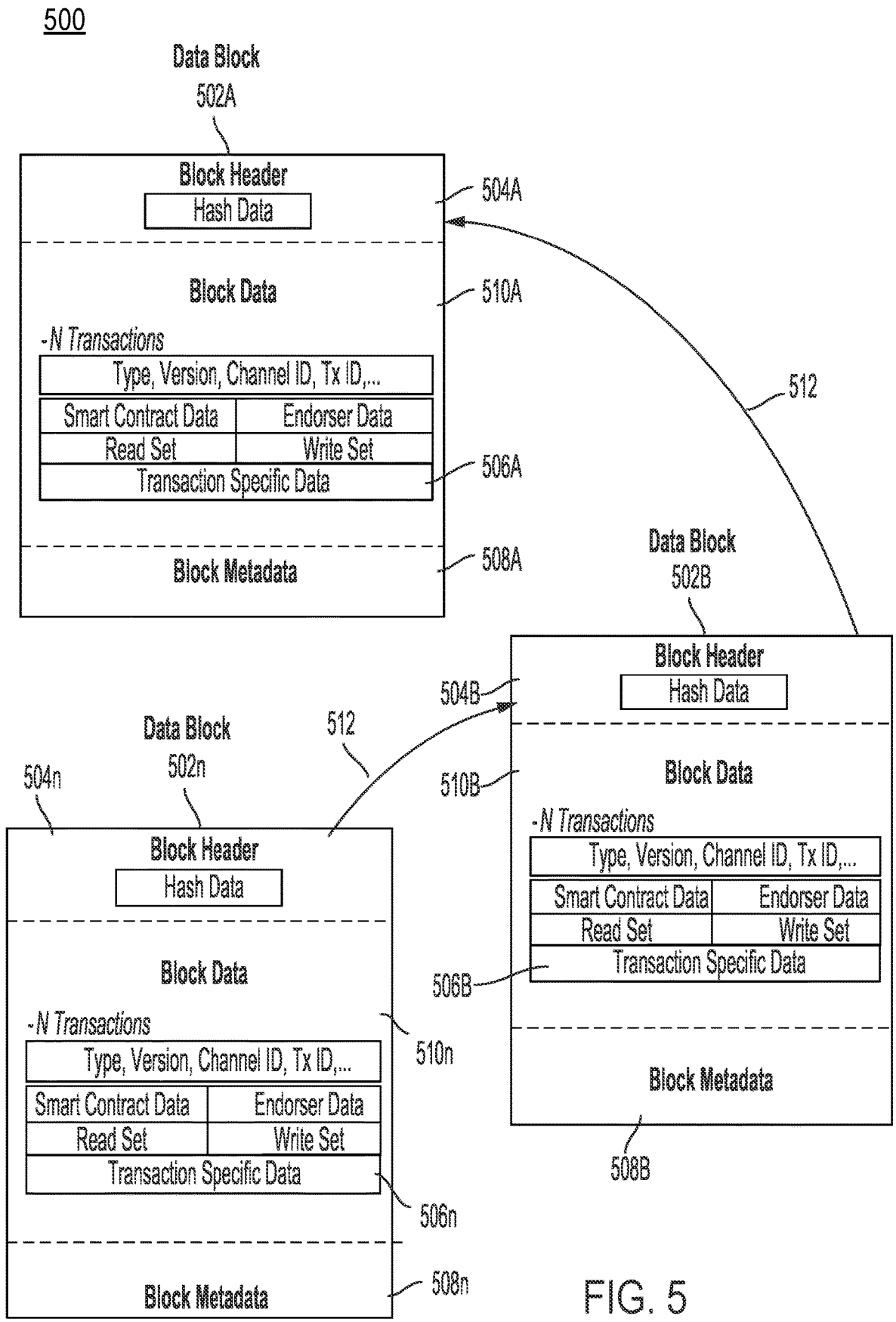

FIG. 4C illustrates yet another example blockchain vehicle configuration for managing blockchain transactions conducted among various vehicles, according to example embodiments FIG. 5 illustrates example data blocks, according to example embodiments.

Figure 6:
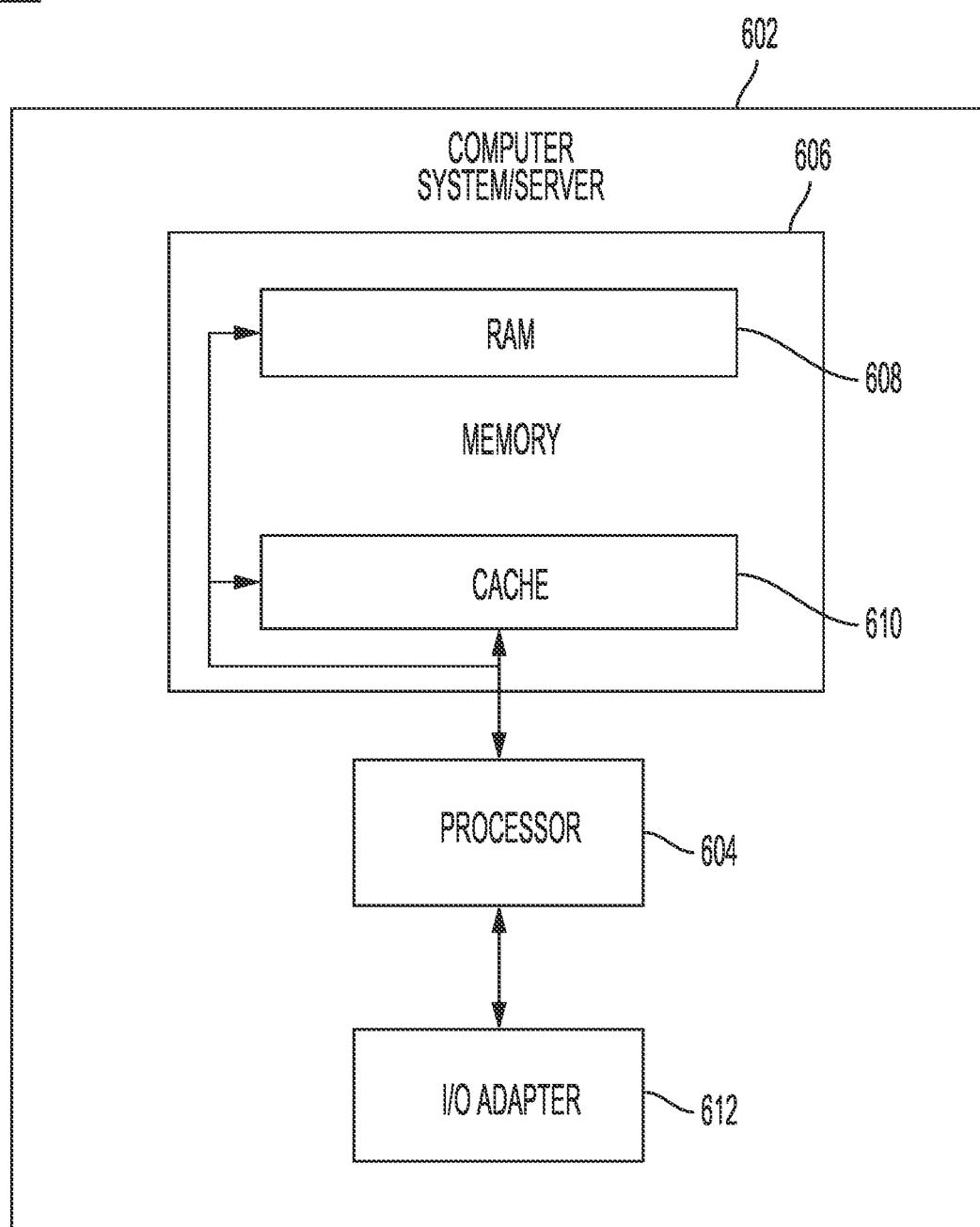

FIG. 6 illustrates an example system that supports one or more of the example embodiments.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve crypto-currencies and use consensus based on various protocols such as proof of work (PoW). On the other hand, a permissioned blockchain database provides a system, which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries, which are not endorsed, are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in an autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator, and the authorization to receive charge or fuel may be performed without any delays provided the authorization is received by the service station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

According to the exemplary embodiments, a transport computer system detects an upcoming exit and determines if the transport is prepared to exit safely. If, for example, the transport is traveling in the incorrect lane or traveling at a speed that is not conducive to making the upcoming exit safely, the transport computer instructs the subject transport as well as other proximate transports to allow the subject transport to exit in a safe manner. The transport computer may connect to other transports and acquire consensus for altering speed and performing other maneuvers so the transport may exit safely. All of the transports may serve as dynamic blockchain peers. This way the communication between the transports is implemented over a blockchain network. The determination of safety level for transport's maneuvers may be implemented by execution of a smart contract.

In another embodiment, a transport may be traveling within a caravan (e.g., a military platoon) and the lead transport may contact all other transports and may a consensus from all other transports for implementing a safe maneuver by the entire caravan. The communication between the transports is implemented over a blockchain network all of the transports belong to. The determination of safety level for caravan's maneuvers may be implemented by execution of a smart contract.

The current system allows for one or more vehicles working together to assess issues related to a transport while in motion. This allows for items to be assessed in real-world driving conditions (verses for example, in a repair shop or at a dealer). These items can include testing such as covers to the rear and front lights, the undercarriage of the vehicle, the condition of the license plate, the motion and effectiveness of wipers, the alignment/steering of the tires, etc.

The current system allows for at least one vehicle to assess another transport. In another embodiments, other vehicles can further assess the transport (in a similar location and/or period of time. This assessment is performed via sensors on the one or more vehicles capturing data such as image, video, or the like of the transport.

The data related to the assessment are sent to a server via a network. The data is then analyzed, and the results of the analysis are sent to the transport (and/or to a driver of the transport). If the transport is autonomous, the transport can utilize the data to attempt to correct the issues (which may include the driving of the transport to a dealer/repair store. In a non-autonomous setting, the information can be used by the driver of the transport to correct the issues, which may include a replacement of noted, defective parts or issues. In another embodiment, the one or more vehicles can perform the assessment and the analysis without providing data to the server and send the result of the analysis directly to the transport via, for example V2V communications.

The items assessed on the transport include (but not limited to) includes tire appearance (low tire, tire bald, out of balance/alignment, etc.), driver appearance (head down, inattentive, texting, sleepy, etc.), brake lights, headlights, fog lights, etc., trunk/door appearance (open, damage), brake/headlight covers (foggy, dirty), license plate check, front and back, damage to transport body, undercarriage (something dragging), valid registration and/or inspection.

Images, video, etc. of the items are sent to the server and analyzed. The analysis includes a comparison of the images/videos of the transport to known, proper images/videos of similar transports.

In another embodiment, the images/videos can be compared to known, proper images/videos and the transport itself (which may be provided by the one or more vehicles at a previous instance, or images/videos of the transport from the server.) In one embodiment, an initial assessment of the items can be made by the one or more vehicles, and if the initial assessment results in a potential issue, then the data is sent to the server. In such a scenario, another vehicle of the one or more vehicles can assess the item/items that the one or more vehicles analyzed as having an issue. The initial assessment, as well as the second assessment (as a validation) all occur while the at least one vehicle, the other vehicle, and the transport are all in motion and/or temporarily stop before and after being in motion (for example, at a stop sign, light, in traffic, etc.)

In another embodiment, the at least one vehicle and/or the other vehicle can query the transport for data related to the issue(s). In such a scenario, the transport would provide the data (acquired from one or more sensors on the transport) to the one or more vehicles and/or the other vehicle via V2V communications. In another embodiment, the data from the transport can also be provided to the server. The data from the transport, along with the data from the one or more vehicle and/or the other vehicles can be analyzed to determine if an issue(s) exist, the severity of issue(s), and/or a proposed solution to the issue(s).

Data received from the at least one vehicle, the other vehicle, and the transport can further be analyzed based on weather conditions, road conditions, driving conditions, and the like to better assess a potential issue(s). For example, if the tires of the transport are assessed to be an issue, if there is ice on the road, an issue may actually may not exist. Further assessment can be performed to make a fuller determination of that initial analysis.

In another embodiment, the transport self-analyzes (via one or more sensors on the transport) the items to determine if issue(s) exists. This self-analysis is based on data/parameters that are considered normal/adequate. For example, during self-analysis, the sensor may determine that the braking is not adequate based on proper petal pressure/braking response data. In such a scenario, the transport may inform the one or more other vehicles and/or the server of the situation and a further visual analysis can be performed by the one or more vehicles and/or the other vehicle. The data from the transport as well as the image(s)/video(s) can be collectively analyzed by the server to determine if an issue(s), the severity of issue(s), and/or a proposed solution to the issue(s).

In another embodiment, video(s)/image(s) are zoomed to a location of the issue(s) and sent to the server for analysis. The zooming may be requested by the server to further aid in the analysis of the data.

In one embodiment, the video(s)/images(s) can be taken by cameras from other moving objects, such as drones, planes, satellites, etc. and fixed objects such as streetlights, traffic lights, buildings, and the like.

Image(s)/video(s) of the transport can be taken from every side and the top of the transport by one or more moving and/or fixed objects.

In a further embodiment, the transport may identify a first transport in a group of transports traveling on a route, maneuver the first transport to be proximate to a second transport in the group, perform a first validation of at least one element of the second transport, by the first transport, perform a second validation of the at least one function of the second transport, by at least one other transport in the group of transports, and notify one or more of the second transport and at least one occupant in the second transport, based on one or more of the first validating and the second validating.

A transport, vehicle, or car, may be referred to as transports, vehicles, and cars and can include other objects such as motorcycles, busses, bicycles, scooters, boats, drones, trains, and/or any other object that can transport individuals and/or goods.

The current system describes a first transport taking video/images of a second transport. If the video/images indicate an initial issue exists (brake lights, head lights, cracked windshield, debris under the car, etc.), the first transport receives previous video/images of the second transport operating normally from a server and compares them to determine if an issue exists.

When describing "near the speed", this can mean above the speed or below the speed of the respective transport.

FIG. 1A illustrates a transport(s) network diagram 100 in accordance to the exemplary embodiments. According to one exemplary embodiment, a transport's 102 processor 104 may detect that the transport 102 is approaching an exit on a road. The processor 104 may calculate a probability that the transport 102 is not prepared to exit. The probability may be calculated based on speed of the transport, speed of traffic, position on the road (i.e., the lane) and a distance to the exit and to other transports. The processor 104 may contact other transports 105 proximate to the transport to request the transport(s) 105 to alter its speed (or position) if the probability of unsafe exit by the transport 102 exceeds a threshold. Once the processor 104 of the transport 102 detects that the transport(s) 105 have altered its speed, the processor 104 my trigger the transport 102 to exit the road.

According to another exemplary embodiment, the transport 102 may be a part of a caravan of the transport 105. The transport 102 may send a request to perform a maneuver to a other transports 105 in the caravan. The transport 102 may receive blockchain consensus from the transports 105 for performing the maneuver. Then, the transport 102 may acquire the speed and distance between the transports 105 in the caravan. The transport 102 may analyze the measurements to determine a safety level of the maneuver of the caravan. Then, the transport 102 may send a command to perform the maneuver to the transports 105 in the caravan, if the safety level exceeds a threshold.

FIG. 1B illustrates a network diagram for insuring safety of transport maneuvering. Referring to FIG. 1B, the network diagram 111 includes a transport node 102 connected to other transport nodes 105 over a blockchain network 106. The transport nodes 102 and 105 may represent transports/vehicles. The blockchain network 106 may have ledger 108 for storing data, such as safety threshold-related data and transactions 110, that record the probability information, timestamps, and other related data.

While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102 system.

The transport node 102 may also include a non-transitory computer readable medium 112 that may have stored thereon machine-readable instructions executable by the processor 104. Examples of the machine-readable instructions are shown as 114-120 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may execute the machine-readable instructions 114 to detect an exit on a road. Each of the transports 102 and 105 may serve as a network node on a blockchain network 106. As discussed above, the blockchain ledger 108 may store safety thresholds and transactions 110. The blockchain 106 network may be configured to use one or more smart contracts located on the transports (i.e., nodes) that may manage transactions for other participating transport nodes 105. The transport node 102 may provide the safety information to the blockchain 106 to be stored on a ledger 108.

The processor 104 may execute the machine-readable instructions 116 to calculate a probability that the transport 102 is not prepared to exit. The processor 104 may execute the machine-readable instructions 118 to request at least one other transport 115 proximate to the transport 102 to alter its speed if the probability exceeds a threshold. The processor 104 may execute the machine-readable instructions 120 to responsive to a detecting of an altering of the speed by the at least one other transport, trigger the transport 102 to exit the road.

FIG. 1C illustrates a network diagram for insuring safety of transport maneuvering. Referring to FIG. 1C, the network diagram 121 includes a transport node 102 (e.g., a vehicle) connected to other transport nodes 105 over a blockchain network 106 that has a ledger 108 for storing safety data (e.g., threshold) and transactions 110. The transport nodes 102 and 105 may serve as blockchain 106 peers. While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102.

The transport node 102 may also include a non-transitory computer readable medium 112' that may have stored thereon machine-readable instructions executable by the processor 104. Examples of the machine-readable instructions are shown as 113-119 and are further discussed below. Examples of the non-transitory computer readable medium 112' may include an electronic, magnetic, optical, or other physical storage device that contains or stores executable instructions. For example, the non-transitory computer readable medium 112' may be a Random Access memory (RAM), an Electrically Erasable Programmable Read-Only Memory (EEPROM), a hard disk, an optical disc, or other type of storage device.

The processor 104 may execute the machine-readable instructions 113 to detect an intention to prepare to take an exit. The blockchain 106 may be configured to use one or more smart contracts that manage transactions for multiple participating nodes (e.g., 105 and 102). The transport node 102 may provide safety-related information to the blockchain 106 and this transaction may be stored on the ledger 108.

The processor 104 may execute the machine-readable instructions 115 to acquire distance and speed measurements. The processor 104 may execute the machine-readable instructions 117 to calculate a probability of a safe exit by the transport 102 based on the measurements. The processor 104 may execute the machine-readable instructions 119 to in response to the probability being below a threshold, request at least one transport from a plurality of the transports proximate to the transport 102 to perform a maneuver to allow for the safe exit of the transport 102.

FIG. 1D illustrates a network diagram for insuring safety of transport maneuvering. Referring to FIG. 1D, the network diagram 123 includes a transport node 102 (e.g., a vehicle) connected to other transport nodes 105 over a blockchain network 106 that has a ledger 108 for storing safety-related information and transactions 110. The transport nodes 102 and 105 may serve as blockchain 106 peers. While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102.

The transport node 102 may also include a non-transitory computer readable medium 112" that may have stored thereon machine-readable instructions executable by the processor 104. Examples of the machine-readable instructions are shown as 130-138 and are further discussed below. Examples of the non-transitory computer readable medium 112" may include an electronic, magnetic, optical, or other physical storage device that contains or stores executable instructions. For example, the non-transitory computer readable medium 112" may be a Random Access memory (RAM), an Electrically Erasable Programmable Read-Only Memory (EEPROM), a hard disk, an optical disc, or other type of storage device.

The processor 104 may execute the machine-readable instructions 130 to send a request to perform a maneuver to a plurality of transports 105 in a caravan. The blockchain 106 may be configured to use one or more smart contracts that manage transactions for multiple participating nodes 102 and 105. The transport node 102 may provide safety-related information to the blockchain 106 and this transaction may be stored on the ledger 108.

The processor 104 may execute the machine-readable instructions 132 to receive agreements from the plurality of the transports 105. The processor 104 may execute the machine-readable instructions 134 to responsive to the agreements, acquire speed and distance measurements of the caravan. The processor 104 may execute the machine-readable instructions 136 to analyze the measurements to determine a safety level of the maneuver. The processor 104 may execute the machine-readable instructions 138 to send a command to perform the maneuver to the plurality of the transports 105 in the caravan, if the safety level exceeds a threshold.

FIG. 1E illustrates a network diagram for insuring safety of transport maneuvering. Referring to FIG. 1E, the network diagram 125 includes a transport node 102 (e.g., a vehicle) connected to other transport nodes 105 over a blockchain network 106 that has a ledger 108 for storing safety-related information and transactions 110. The transport nodes 102 and 105 may serve as blockchain 106 peers. While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102.

The transport node 102 may also include a non-transitory computer readable medium 112''' that may have stored thereon machine-readable instructions executable by the processor 104. Examples of the machine-readable instructions are shown as 133-139 and are further discussed below. Examples of the non-transitory computer readable medium 112''' may include an electronic, magnetic, optical, or other physical storage device that contains or stores executable instructions. For example, the non-transitory computer readable medium 112''' may be a Random Access memory (RAM), an Electrically Erasable Programmable Read-Only Memory (EEPROM), a hard disk, an optical disc, or other type of storage device.

The processor 104 may execute the machine-readable instructions 133 to acquire a plurality of measurements of a caravan comprising a plurality of transports 105. The blockchain 106 may be configured to use one or more smart contracts that manage transactions for multiple participating nodes 102 and 105. The transport node 102 may provide safety-related information to the blockchain 106 and this transaction may be stored on the ledger 108.

The processor 104 may execute the machine-readable instructions 135 to analyze the measurements based on information received from an external source (e.g., a highway infrastructure system). The processor 104 may execute the machine-readable instructions 137 to determine a safety level of the caravan based on the analysis. The processor 104 may execute the machine-readable instructions 139 to send a command to adjust travel parameters to a plurality of transports in a caravan in response to the safety level being below a threshold.

FIG. IF illustrates an example network diagram 140, according to example embodiments. Functionality of the instant application is executed in the instant application 150 (FIG. 1F), which may wholly or partially reside on one or more of the transports 142, 142', 142", the network 144, the server 146, and any other element containing a processor and memory. In one embodiment, the instant application includes one or more of code executed in a processor in a transport, the processing of data from sensors on a transport, receiving information from one or more servers/databases/networks.

In one embodiment, the instant application describes a more intuitive approach to lane changing. The instant application informs a transport when the transport should and should not move into another lane. The decision is based on a number of factors including whether the transport's (and other transports') positions, and/or recent speeds warrant the move into another lane.

The system of the instant application provides a number of advantageous results including creating an efficient driving situation (cars aren't having to maneuver into a middle lane and back to get around a slower moving transport), and a safe driving situation (overcomes an issue of tailgating and precludes the need for one transport to markedly increase its speed to get around a slower transport).

In another embodiment, a transport is traveling down a road, such as a two lane road. The transport is notified by the instant application that a lane switch is advised (i.e., the transport is in lane-A and should move into lane-B. Before the transport moves into lane-B, the instant application (executing in the server 106, in one embodiment) determines certain data which may be received at the server 106 via the network 144, from the transport 142, 142', 142". The data may include one or more of the current traffic speed of the lane, the current average traffic speed of the lane, the historical traffic speed of the lane, the position of the transport, the speed of the transport, the position of other transports, the speeds of the other transports, current weather conditions, current road conditions, current visibility and the current time of day. The system notifies the transport when it is recommended for the transport to switch lanes based on an analysis of the certain data. This notification may be sent from the instant application executing partially or wholly in the server 146, and messaging is sent from the server 146 to the transport(s) 142, 142', 142", in one embodiment.

In another embodiment, the average traffic speed being greater or less than the current traffic speed is based on the current speed above or below a threshold.

FIG. 1F shows a network diagram 140 of one example of the instant application. Three transports (142, 142', 142") are present and may use protocols that normally support vehicle to vehicle communication to communicate amongst each other (such as Dedicated Short-Range Communications (DSRC), cellular communication, Wi-Fi, Bluetooth, and the like). The transports (142, 142', 142") may also be connected to a network 144, which may be a network such as a global network or Internet and communicate via a suitable wireless communication protocol, such as a wireless telephony (e.g. GSM, CDMA, LTE, etc.), Wi-Fi (802.11 standards), WiMAX, Bluetooth, infrared or radio frequency communications, etc. A server 146 is coupled to the network and may have a database 148 coupled to or integrated with the server. Other databases and servers may be present and connected to the network and may be directly or communicably coupled to the server 146 and the network 144.

The instant application 150 executes on a computer 152 containing a processor and memory. The computer may be fully or partially located on one or more of the transports (142, 142', and 142"), the network 144, and the server 146.

In one embodiment, the server 146 is made aware of transports (142, 142', and 142") by updates sent to the server 146 via the transports, wherein the updates are routed through the network 144 to the server 146. These updates include position, speed, direction, etc. of the transports which are obtained via sensors on the transports (142, 142', and 142") that communicate with the computer 152 on the transports (142, 142', and 142").

In another embodiment, the location, speed, and direction of the first transport, second transport, and other transports (142', 142', 142") may be determined by one or more of the first transport, the second transport, the other transports, and the server.

FIG. 1G illustrates an example diagram of transports on a road 155, according to example embodiments. FIG. 1G shows a diagram 155 of transports on a road that perform maneuvers where a potentially dangerous situation arises. For example, a transport is desiring to proceed in a left-hand lane but is precluded from doing so because it is blocked by another transport. Using various communication protocols, such as transport to transport communication and notifications to other transports and/or drivers or occupants, a potentially dangerous situation can be averted.

Normally, the left-hand lane is the fastest travelling lane, the next right lane is the next fastest travelling lane, and this continues until the farthest right-hand lane is normally the slowest traveling lane. Therefore, when a transport is traveling slower than the flow of traffic, other transports may become impatient and dangerous situations may arise.

In one embodiment, the instant application is executing wholly or partially on a processor on a transport. The processor may be part of the transport's infotainment system, a transport computer, or any other device containing a processor and memory associated with the transport. All transports are coupled with the server 146 via the network 144. The server 146 communicates with the transports and may store data in a database 148 (FIG. 1F).

A first transport 162 is operating on a road in the first lane 173, and a second transport 164 is approaching the first transport 162 at a higher speed. The second transport 164 is desiring to pass the first transport 162. This may be observed by the second transport 164 operating at a close distance (otherwise known as 'tailgating'). Other transports 166 may be present on other lanes, such as a second lane 173, wherein the second transport 164 is unable to pass the first transport 162. Other transports may also be present (not depicted) that continually disallow the second transport 164 to pass the first transport 162.

The first transport 162 determines the speed and/or distance of other transport proximate to it. This may be via sensors on the first transport 162 such as video cameras, V2V communication, or the like.

The instant application determines that no other transports (such as transport 168), are ahead of the first transport 162 by a first distance 160 in a first lane 171. This determination verifies that no other transports (such as transport 168) are ahead of the first transport 162 less than the first distance 160. The first transport 162 should not allow the second transport 164 to pass (by the first transport 162 occupying the second lane 173) if there is not enough room for the second transport 164 to travel ahead at a speed approximately equal to its current speed.

The instant application determines that there are no other transports (such as transport 166) beside the first transport 162 by a second distance 163 in the next right lane 173. This determination verifies that there is sufficient room for the transport 162 to maneuver into the next right lane 173, and that no other transports (such as transport 166) are present to not allow the maneuvering.

In another embodiment, the first transport 162 remains in the second lane 173 when the second transport 164 and one or more additional transports 170 are moving at a faster speed in the first lane 171 than the first transport 162.

In another embodiment, the instant application will notify at least one driver and/or occupant of the transports 162 and 164 via data such as text, voice, video and/or image to move into the second lane 173 and to proceed in the first lane 171, respectively. The data can appear on a display of the transport 162 with text such as "A transport behind you desires to pass." The text may also be displayed on a personal wireless device (such as a cell phone of an occupant of transport 162), a Heads Up Device (HUD), a display of the infotainment system, and the like. In another embodiment, a speech-to-text functionality of the instant application allows for spoken text through first transport 162 audio speakers. In yet another embodiment, haptic functionality is performed on first transport 162, such as a vibrating of one or more of a driver's seat, a vibrating of the right side of the steering wheel, and the like.

The first transport 162, now in the second lane 173 may maneuver back into the first lane 171 when there are no other transport 170 traveling in the first lane 171 at a third distance 165 behind the first transport 162 and at or near the speed of the second transport 164.

In an alternate embodiment, the first transport 162 may return to the first lane 171 when there are no other transports traveling near the second transport 164. For example, if there are transports behind the second transport 164, traveling at or near the speed of the second transport 164 and behind the second transport 164, then the first transport 162 will not maneuver back into the first lane 171.

In yet another alternate embodiment, the same functionality as depicted above may be repeated using the second lane 173 as the first lane 171, and the third lane 175 as the second lane 173.

In yet a further embodiment, the same functionality depicted above with respect to the first lane 171 and the second lane 173 may be repeated using a single lane (for example the first lane 171) and a shoulder near the single lane (for example, the second lane 173).

In yet a further embodiment, the first transport 162 returns to the first lane 171 only when there are no other transports traveling near the second transport 164.

When the first transport 162 is traveling below a speed limit, the instant application sends an alert to at least one occupant of the first transport 162. Traveling below the current speed limit may be dangerous as other transports may not see the slower moving transport, adding to the danger is that most transport normally travel above the current speed limit.

A transport may know the current speed limit by querying a navigational function on the transport that normally is aware of a current speed limit at a location. Utilizing this knowledge, the first transport 162, using sensors for example, will determine a delta between the current speed of the first transport 162 and the current speed limit. When the delta is above a threshold, the instant application executing on a computer associated with the first transport 162, such as a transport computer, creates a notification including text such as "You are traveling below the speed limit" or the like. This message is shown to the at least one occupant of the transport on a display of the first transport 162.

When the first transport 162 is in the second lane 173, maneuvering there from a first lane 171 due to a second transport 164 desiring to pass, the first transport 162 can maneuver into a slower lane such as a third lane 175 after: 1) A period of time that the first transport 162 is moving below the speed limit (for example 30 seconds) and 2) a number of alerts (for example, 3) have been sent.

In another embodiment, when the road is a 3-lane road, the third lane 175 is typically the slowest moving lane. If the road is a 4-lane road, the third lane 175 is typically the second slowest lane. The functionality described and depicted herein can occur on a single lane (with a shoulder) and/or on a road or highway with a plurality of lanes without deviating from the scope of the instant application.

In another embodiment, the first transport 162 alerts one or more of the second transport 164 and other transports on the road to decrease their speed when the first transport 162 is unable to move into another lane, such as the second lane 173. This alerting may utilize V2V protocols, Bluetooth, Wi-Fi, cellular communication, or the like. This may help alleviate frustration by occupants of the second transport 164 and the other transports as they may come to understand that while occupant(s) of the first transport 162 may desire to allow other transports to pass, they are unable to do so. The alerting may be received and executed on the second transport 164 and other transports via data sent to at least one display associated with the second transport 164 and other transports, a vibrating of a portion of the transport such as a steering wheel and/or a seat, and the like.

FIG. 1H illustrates another example diagram of transports on a road 180, according to example embodiments. FIG. 1H shows another diagram 180 of transports on a road, where the first transport 162 has maneuvered 182 from the first lane 171 to the second lane 173 to allow the second transport 164 to pass first transport 162 in the first lane 171. In one embodiment, the instant application is configured to perform (or assist in performing) this activity by the maneuvering the first transport 162 when first transport 162 is an autonomous transport. In another embodiment, the instant application is configured to perform (or assist in performing) sending a notification to a driver and/or passenger(s) of the transport 162 to maneuver to the second lane 173 and sending a notification to a driver and/or passenger(s) of the transport 164 to proceed ahead in the first lane 171.

FIG. 1I illustrates a further example diagram of transports on a road 190, according to example embodiments. FIG. 1I shows another diagram 190 of transports on a road. The transports (162, 164, 166, 168) send transport data 192 to a server 146 (via the network 144). The transport data 192 contains data such as the current direction, speed, location, time, acceleration rate, deceleration rate, make, model, year, mileage, maintenance activities, number of sensors, sensor types, location of sensors, operability of sensors, etc. of the transport, data from sensors on the transport, camera data, occupant data, and other transport-related data. This information may be stored in a database such as Database 148, for analysis. The server 146 sends result data 194 to a transport (such as transport 164) of an event. For example, an event may be transport 164 desiring to pass the transport 162. This is indicated by the transport 164 traveling close to the first transport 162, otherwise known as 'tailgating' or the transport 164 sending a message to transport 162 (directly or via the server 146) indicating a desire to pass. When the event is triggered, the server 146 sends result data 194 to the transport of the event (such as transport 164). The information sent is comprised of one or more of: action (a reason such as another car is disallowing a lane change), location (a position such as the transport on a right-hand side is in the way), time (a period such as when a maneuver into a lane will be permissible (e.g. 13 seconds)).

The time is determined by one or more of the first transport 162 and a server 146 wherein the traffic in the lanes proximate to the first transport 162 and traffic ahead of the first transport 162 (such as transport 168 and other transports, not depicted) are analyzed to calculate an approximate amount until a maneuver into the next right lane is permitted. For example, if the first transport 162 and/or the server 146 determine that there is traffic ahead, this may also be included in the alert to help the transport 164 understand when passing will be permitted and when passing will not be permitted, and an approximate amount of time (as determined by the instant application 150 executing on the server 146 and/or one or more of the transports and/or one or more wireless devices in the transports) until the first transport 162 is able to maneuver to another lane to provide a passing opportunity. The result data 194 may include other information such as expected action, expected result, related audio/video/image(s), etc.

In another embodiment, the speeds of the transports in the first lane 171 are taken into account, before a recommendation is made for the first transport 162 to maneuver into a second lane 173. A recommendation will be made when the speed of the second transport 164 (which has been traveling at a higher speed that the first transport 162 before maneuvering behind the first transport 162) and the transport ahead of the first transport (such as transport 168) is traveling at or near the speed of the second transport 164 at a distance, such as distance 160 (see FIG. 1G). This recommendation is based on at least 2 reasons: 1) It may not be efficient for the first transport 162 to maneuver into another lane if the traffic ahead is traveling at a slower speed or if the traffic ahead is stopped (or near-stopped). The second transport 164 would pass, only to be held up again by the traffic ahead in the lane, and 2) If the second transport 164 is traveling at a high speed, and the first transport 162 maneuvers into another lane to allow passing, the second transport 164 may be put into a dangerous situation, not being able to see a transport ahead, such as transport 168, which is traveling slower. The second transport 164 may have to apply brakes, or worse, be put into a dangerous situation.

In another embodiment, the instant application executing fully or partially in the first transport 162 traveling in a first lane 171 determines a current speed of transports traveling in a second lane 173, such as transport 166. This may be determined by sensors, cameras, or the like on transport 162. When none of the transports traveling in the second land 173 are moving at or near the speed of the first transport 162 at a second distance 163 (FIG. 1G), the first transport 162 maneuvers into the second lane 173.

In a further embodiment, if the speed of the other transports is above the speed of the first transport 162 at a third distance in the second lane 173, maneuvering to the second lane 173 is not recommended for the first transport 162.

In yet a further embodiment, no transports behind transport 166 in the second lane 173 and behind the first transport 162 in the first lane 171 should be above the speed of the first transport 162 in the first lane 171 at a fourth distance (not depicted). For example, transport 162 is traveling at a speed of 70 mph in the first lane 171 with no other transports beside in the second lane 173, it would be seemingly possible to maneuver into the second lane 173. Yet, there exists another transport 20 yards behind the first transport 162 in the second lane 173 traveling at 80 mph, therefore it is incorrect to instruct the first transport 162 to move into the second lane 173.

Based on this example, the instant application has determined the following: speed of transport 162 in the first lane: 70 mph, speed of another transport in the second lane: 80 mph, distance between the transport 162 and the other transport: 30 yards.

The amount of time to safely maneuver into the second lane may then be calculated as follows:

The delta speed between the two transports is 10 mph (70 mph and 80 mph). The delta distance is 30 yards. Therefore, using the equation time equals distance divided by speed, the following calculation is used to determine when the two transports will be side-by-side:

Convert Speed: 10 miles/hour=14.6 feet per second
Time=Distance/Speed
Time=30 yards/14.6 feet per second
Time=90 feet/14.6 feet per second
Time=6.16 seconds Therefore, the other transport will have caught up to transport 162 in approximately 6 seconds. Three more seconds are added until transport 162 will be able to safely maneuver into the second lane 173 to give the other transport time to provide a safe distance ahead. Therefore, the alert can include: "In 9 seconds, it should be safe to maneuver into the second lane". After the 9 seconds and before any maneuvering occurs, the instant application will perform the same determination to take current traffic into account, and it's always changing environment.

In another embodiment, transport 162, may stay in the right-lane 173, even though notifications indicate that the transport should move into another lane to allow a transport behind 164 to pass.

In yet another embodiment, transport 164 is traveling in the second land 173. The server 146 sends a notification to transport 162 to maintain its current position and/or slow its speed. Transport 164 then is able to merge into the first lane 171 as long as the first distance 160 (see FIG. 1G) is not exceeded.

A smart contract of a blockchain network is executed, in one embodiment, to perform the validation required before instructing the first transport 162 to maneuver into an alternate lane (e.g. lane 173). The smart contract validates the first transport 162, the second transport 166, the other transports ahead of the first transport 168, the other transports behind the first transport 164, the speed of the first transport 162, the speed of the second transport 166, the first distance 160 (FIG. 1G), the second distance 163 (FIG. 1G), and the third distance 165 (FIG. 1G), wherein one or more of the first transport 162, the second transport 164, and other transports belong to the blockchain network.

In an alternate embodiment, the smart contract can also include the speed of the other transports ahead and behind the first transport 162 and the second transport 164.

In an alternate embodiment, consensus must be obtained by the system before instructing the first transport 162 to maneuver into another lane (e.g. lane 173). The consensus is sought by transports that proximate to the first transport, such as the second transport 166, the other transports ahead of the first transport 168, and other transports behind the first transport (e.g. transport 170). For example, a computer of the transport may connect to other transports and acquire consensus for validation of the distance between the transports. All of the transports may serve as dynamic blockchain peers such that communication between the transports is implemented over a blockchain network. The determination of safety level for transport's maneuvers may be implemented by execution of a smart contract.

In yet a further embodiment, if the transport 162 does not comply (for example, speeds up to prohibit transport 164 from merging), the server 146 can note this action (or inaction) and maneuver other transports accordingly. For example, if transport 160 (FIG. 1G) is much further behind and traveling at a faster speed than transport 162 (and transport 164 is no longer in the second lane 173), the server 146 may send a notification to transport 170 to maneuver to the second lane 173 and/or to the third lane 175 well in advance of being in proximity to the transport 162 in order to more efficiently manage navigation of the transport 160 (and other transports on the road) and to avoid a potentially dangerous situation.

In other embodiments, the system 140 can determine that a transport in a particular lane is traveling at a higher speed than that lane can accommodate. For example, the lane may have a certain number of vehicles traveling at a lower speed and causing a traffic buildup. The system may determine that switching lanes is not a possibility (because the lane may be occupied by one or more other transports, etc.). In such a situation, the system may determine that a safer action would be to advise the transport to maneuver away from the heavily trafficked lane (for example, to a shoulder on a highway, to a parking lot or other street on a roadway, etc.).

In a further embodiment the system 140 may advise the transport to deaccelerate before, during, and/or after the instruction(s) to maneuver away from the problematic lane. The system will also advise the transport to come to a complete stop at any juncture based on the traffic conditions, may provide a notification to turn on hazard lights or other safety indicators, or may directly do so by accessing one or more systems/sensors on the transport as described herein. When the system determines it is safe to maneuver back to a lane and continue to travel, the system will indicate an appropriate time to do so by communicating with the transport and/or a device associated with the transport as described herein.

FIG. 1J illustrates a network diagram for insuring proper lane management. Referring to FIG. 1J, the network diagram 195 includes a transport node 105 (e.g., a vehicle) connected to other transport nodes 105 over a blockchain network 106 that has a ledger 108 for storing safety-related information and transactions 110. The transport nodes 102 and 105 may serve as blockchain 106 peers. While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102.

The transport node 102 may also include a non-transitory computer readable medium 102A that may have stored thereon machine-readable instructions executable by the processor 104. Examples of the machine-readable instructions are shown as 196A-196E and are further discussed below. Examples of the non-transitory computer readable medium 102A may include an electronic, magnetic, optical, or other physical storage device that contains or stores executable instructions. For example, the non-transitory computer readable medium 102A may be a Random Access memory (RAM), an Electrically Erasable Programmable Read-Only Memory (EEPROM), a hard disk, an optical disc, or other type of storage device.

The processor 104 may execute the machine-readable instructions 196A-196E to maneuver the transport in an alternate lane wherein consensus is obtained from multiple transports in proximity, each transport being a transport node 105. The blockchain 106 may be configured to use one or more smart contracts that manage transactions for multiple participating nodes 102 and 105. The transport node 102 may provide safety-related information to the blockchain 106 and this transaction may be stored on the ledger 108.

The processor 104 may execute the machine-readable instructions 196B to determine that a speed of a second transport is greater than a speed of the first transport, such as the situation when the second transport is behind the first transport. The processor 104 may execute the machine-readable instructions 196C to determine that no other transport are ahead of the first transport by a first distance and beside the first transport by a second distance. The processor 104 may execute the machine-readable instructions 196D to maneuver the transport to a second lane to pass the first transport in the first lane. The processor 104 may execute the machine-readable instructions 196E to maneuver the transport to the first lane when there are no other transports traveling in the first lane at a third distance behind the first transport and at or near the speed of the second transport.

FIG. 1K illustrates a network diagram for diagnosing issues on a transport. Referring to FIG. 1K, the network diagram 197 includes a transport node 102 (e.g., a vehicle) connected to other transport nodes 105 over a blockchain network 106 that has a ledger 108 for storing safety-related information and transactions 110. The transport nodes 102 and 105 may serve as blockchain 106 peers. While this example describes in detail only one transport node 102, multiple such nodes may be connected to the blockchain 106. It should be understood that the transport node 102 may include additional components and that some of the components described herein may be removed and/or modified without departing from a scope of the transport node 102 disclosed herein. The transport node 102 may have a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the transport node 102 may include multiple processors, multiple cores, or the like, without departing from the scope of the transport node 102.

The transport node 102 may also include a non-transitory computer readable medium 102B that may have stored thereon machine-readable instructions executable by the processor 104. Examples of the machine-readable instructions are shown as 197A-197E and are further discussed below. Examples of the non-transitory computer readable medium 102B may include an electronic, magnetic, optical, or other physical storage device that contains or stores executable instructions. For example, the non-transitory computer readable medium 102B may be a Random Access memory (RAM), an Electrically Erasable Programmable Read-Only Memory (EEPROM), a hard disk, an optical disc, or other type of storage device.

The processor 104 may execute the machine-readable instructions 197A to obtain a first data including one or more of at least one first video and at least one first image of a moving transport. The blockchain 106 may be configured to use one or more smart contracts that manage transactions for multiple participating nodes 102 and 105. The transport node 102 may provide the at least one first video to the blockchain 106 and this transaction may be stored on the ledger 108.

The processor 104 may execute the machine-readable instructions 197B to analyze the first data to determine an initial issue. The processor 104 may execute the machine-readable instruction 197C to query a server for a second data based on the analyzing, wherein the second data is one or more of at least one second video and at least one second image of the moving transport at a previous time. The processor 104 may execute the machine-readable instruction 197D to determine a verified issue exists when there is a delta between the first data and the second data. The processor 104 may execute the machine-readable instruction 197E to send the verified issue to a server.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure, which includes performing a hash of the data contents of the transactions in a current block and referencing a previous hash of a previous block. Within the blockchain, one or more smart contracts 230 may exist that define the terms of transaction agreements and actions included in smart contract executable application code 232, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time. Then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 234, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 230, which are then stored in a blockchain. For example, sensor thresholds stored in the smart contract can be used as the basis for whether a detected service is necessary and when and where the service should be performed.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices, which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code, which is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

FIG. 2C illustrates a blockchain configuration for storing blockchain transaction data, according to example embodiments. Referring to FIG. 2C, the example configuration 270 provides for the vehicle 272, the user device 274 and a server 276 sharing information with a distributed ledger (i.e., blockchain) 278. The server may represent a service provider entity inquiring with a vehicle service provider to share user profile rating information in the event that a known and established user profile is attempting to rent a vehicle with an established rated profile. The server 276 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 280 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

FIG. 3A illustrates a flow diagram 300, according to example embodiments. Referring to FIG. 3A, an example method may be executed by the transport node 102 (see FIG. 1B). It should be understood that method 300 depicted in FIG. 3A may include additional operations and that some of the operations described therein may be removed and/or modified without departing from the scope of the method 300. The description of the method 300 is also made with reference to the features depicted in FIG. 1B for purposes of illustration. Particularly, the processor 104 of the transport node 102 may execute some or all of the operations included in the method 300.

With reference to FIG. 3A, at block 302, the processor 104 may detect an exit on a road. At block 304, the processor 104 may calculate a probability that the transport is not prepared to exit. At block 306, the processor 104 may request at least one other transport proximate to the transport to alter its speed if the probability exceeds a threshold. At block 308, the processor 104 may, responsive to a detecting of an altering of the speed by the at least one other transport, trigger the transport to exit the road.

FIG. 3B illustrates a flow diagram 320 of an example method, according to example embodiments. Referring to FIG. 3B, the method 320 may also include one or more of the following steps. At block 322, the processor 104 may calculate the probability based on a speed of the transport and a distance to the exit. At block 324, the processor 104 may calculate the probability based on a lane the transport is in. At block 326, the processor 104 may acquire a current distance to the exit and to reduce the transport speed based on the current distance. At block 328, the processor 104 may receive an agreement from the at least one other transport to alter its speed. Note that the agreement may constitute a consensus of a blockchain the transport and the at least one other transport belong to. At block 329, the processor 104 may execute a smart contract to calculate the probability that the transport is not prepared to exit.

FIG. 3C illustrates a flow diagram 330, according to example embodiments. Referring to FIG. 3C, an example method may be executed by the transport node 102 (see FIG. 1C). It should be understood that method 330 depicted in FIG. 3C may include additional operations and that some of the operations described therein may be removed and/or modified without departing from the scope of the method 330. The description of the method 330 is also made with reference to the features depicted in FIG. 1C for purposes of illustration. Particularly, the processor 104 of the transport node 102 may execute some or all of the operations included in the method 330.

With reference to FIG. 3C, at block 333, the processor 104 may detect an intention to prepare to take an exit. At block 335, the processor 104 may acquire distance and speed measurements. At block 337, the processor 104 may calculate a probability of a safe exit by the transport based on the measurements. At block 339, the processor 104 may in response to the probability being below a threshold, request at least one transport from a plurality of the transports proximate to the transport to perform a maneuver to allow for the safe exit of the transport.

FIG. 3D illustrates a flow diagram 340 of an example method, according to example embodiments. Referring to FIG. 3D, the method 340 may also include one or more of the following steps. At block 342, the processor 104 may responsive to a detecting of an altering of the speed by the at least one transport from the plurality of the transports, inform a user of the transport to proceed to exit. At block 344, the processor 104 may calculate the probability of the safe exit based on a speed of the at least one transport from a plurality of the transports proximate to the transport. At block 346, the processor 104 may calculate the probability of the safe exit based on a lane the transport is in. At block 348, the processor 104 may receive an agreement from the at least one transport from a plurality of the transports proximate to the transport to alter its speed. Note that the agreements may constitute a consensus of a blockchain. At block 350, the processor 104 may execute a smart contract to calculate the probability of the safe exit by the transport based on the measurements.

FIG. 3E illustrates a flow diagram 360, according to example embodiments. Referring to FIG. 3E, an example method may be executed by the transport node 102 (see FIG. 1D). It should be understood that method 360 depicted in FIG. 3E may include additional operations and that some of the operations described therein may be removed and/or modified without departing from the scope of the method 360. The description of the method 360 is also made with reference to the features depicted in FIG. 1D for purposes of illustration. Particularly, the processor 104 of the transport node 102 may execute some or all of the operations included in the method 360.

With reference to FIG. 3E, at block 362, the processor 104 may send a request to perform a maneuver to a plurality of transports in a caravan. At block 364, the processor 104 may receive agreements from the plurality of the transports. At block 366, the processor 104 may responsive to the agreements, acquire speed and distance measurements of the caravan. At block 368, the processor 104 may analyze the measurements to determine a safety level of the maneuver. At block 370, the processor 104 may send a command to perform the maneuver to the plurality of the transports in the caravan, if the safety level exceeds a threshold.

FIG. 3F illustrates a flow diagram 380 of an example method, according to example embodiments. Referring to FIG. 3F, the method 380 may also include one or more of the following steps. At block 382, the processor 104 may send a command to the plurality of the transports in the caravan to reduce speed, is the safety level is below the threshold. At block 384, the processor 104 may acquire new measurements based on a reduced speed. At block 386, the processor 104 may determine the safety level of the maneuver based on the new measurements. At block 388, the processor 104 may send a command to perform the maneuver to the plurality of the transports in the caravan, upon the safety level exceeding or equaling a threshold. Note that the agreements may constitute a consensus on a blockchain the plurality of the transports in the caravan belong to. At block 389, the processor 104 may execute a smart contract to analyze the measurements to determine the safety level of the maneuver.

FIG. 3G illustrates a flow diagram 390, according to example embodiments. Referring to FIG. 3G, an example method may be executed by the transport node 102 (see FIG. 1F). It should be understood that method 390 depicted in FIG. 3G may include additional operations and that some of the operations described therein may be removed and/or modified without departing from the scope of the method 390. The description of the method 390 is also made with reference to the features depicted in FIG. 1F for purposes of illustration. Particularly, the processor 104 of the transport node 102 may execute some or all of the operations included in the method 390.

With reference to FIG. 3G, at block 391, the processor 104 may acquire a plurality of measurements of a caravan comprising a plurality of transports. At block 393, the processor 104 may analyze the measurements based on information received from an external source. At block 395, the processor 104 may determine a safety level of the caravan based on the analysis. At block 397, the processor 104 may send a command to adjust travel parameters to a plurality of transports in a caravan in response to the safety level being below a threshold.

FIG. 3H illustrates a flow diagram 394 of an example method, according to example embodiments. Referring to FIG. 3H, the method 394 may also include one or more of the following steps. At block 401, the processor 104 may send a command to the plurality of the transports in the caravan to adjust speed. At block 403, the processor 104 may send a command to the plurality of the transports in the caravan to adjust a distance between the transports. At block 405, the processor 104 may determine the safety level of the caravan based on the adjusted travel parameters. At block 407, the processor 104 may send a command to further adjust the travel parameters of the plurality of the transports in the caravan, if the safety level of the caravan remains below the threshold. Note that the adjustment of the travel parameters may constitute a consensus on a blockchain the plurality of the transports in the caravan belong to. At block 409, the processor 104 may execute a smart contract to determine the safety level of the caravan based on the adjustment of the travel parameters.

FIG. 3I illustrates a flow diagram 392 of an example method, according to example embodiments. Referring to FIG. 3I, a first transport is traveling in a first lane 392A. A processor of the first transport determines that a speed of a second transport is greater than a speed of the first transport when the second transport is behind the first transport 392B. The first transport determines that no other transports are ahead of the first transport by a first distance in the first lane and beside the first transport by a second distance in a second lane 392C. The first transport maneuvers to the second lane allowing the second transport to pass the first transport in the first lane 392D. The first transport maneuvers to the first lane when there are no other transports traveling in the first lane at a third distance behind the first transport and at or near the speed of the second transport 392E.

FIG. 3J illustrates a flow diagram 396 of an example method, according to example embodiments. Referring to FIG. 3J, the method 396 may also include one or more of the following steps. At block 396A, the processor 104 may send a command to obtain a first data including one or more of at least one first video and at least one first image of a moving transport. At block 396B, the processor 104 may send a command to analyze the first data to determine an initial issue. At block 396C, the processor 104 may send a command to query a server for a second data based on the analyzing, wherein the second data is one or more of at least one second video and at least one second image of the moving transport at a previous time. At block 396D, the processor 104 may send a command to determine a verified issue exists when there is a delta between the first data and the second data. At block 396E, the processor 104 may send a command to send the verified issue to a server.

FIG. 4A illustrates an example blockchain vehicle configuration 400 for managing blockchain transactions associated with a vehicle, according to example embodiments. Referring to FIG. 4A, as a particular transport/vehicle 425 is engaged in transactions, such as asset transfer transactions (e.g., access key exchanges, vehicle service, dealer transactions, delivery/pickup, transportation services, etc.). The vehicle 425 may receive assets 410 and/or expel/transfer assets 412 according to a transaction(s) defined by smart contracts. The transaction module 420 may record information, such as parties, credits, service descriptions, date, time, location, results, notifications, unexpected events, etc. Those transactions in the transaction module 420 may be replicated into a blockchain 430, which may be managed by a remote server and/or by a remote blockchain peers, among which the vehicle 425 itself may represent a blockchain member and/or blockchain peer. In other embodiments, the blockchain 430 resides on the vehicle 425. The assets received and/or transferred can be based on location and consensus as described herein.

FIG. 4B illustrates an example blockchain vehicle configuration 440 for managing blockchain transactions between a service node (e.g., a gas station, a service center, a body shop, a rental center, automotive dealer, local service stop, delivery pickup center, etc.) and a vehicle, according to example embodiments. In this example, the vehicle 425 may have driven itself to a service node 442, because the vehicle needs service and/or needs to stop at a particular location. The service node 442 may perform a service (e.g., pump gas) or may register the vehicle 425 for a service call at a particular time, with a particular strategy, such as oil change, battery charge or replacement, tire change or replacement, and any other transport related service. The services rendered 444 may be performed based on a smart contract, which is downloaded from or accessed via the blockchain 430 and identified for permission to perform such services for a particular rate of exchange. The services may be logged in the transaction log of the transaction module 420, the credits 412 are transferred to the service center 442 and the blockchain may log transactions to represent all the information regarding the recent service. In other embodiments, the blockchain 430 resides on the vehicle 425 and/or the service center server. In one example, a transport event may require a refuel or other vehicle service and the occupants may then be responsible for the asset value increase for such service. The service may be rendered via a blockchain notification, which is then used to redistribute the asset value to the occupants via their respective asset values. Responsibility for the service center activities can be based on asset transfer as described herein.

FIG. 4C illustrates an example blockchain vehicle configuration 450 for managing blockchain transactions conducted among various vehicles, according to the exemplary embodiments. The vehicle 425 may engage with another vehicle 408 to perform various actions such as to share access keys, transfer keys, acquire service calls, etc. when the vehicle has reached a status where the assets need to be shared with another vehicle. For example, the vehicle 408 may be due for a battery charge and/or may have an issue with a tire and may be in route to pick up a package for delivery. The vehicle 408 may notify another vehicle 425 which is in its network and which operates on its blockchain member service. The vehicle 425 may then receive the information via a wireless communication request to perform the package pickup from the vehicle 408 and/or from a server (not shown). The transactions are logged in the transaction modules 452 and 420 of both vehicles. The assets are transferred from vehicle 408 to vehicle 425 and the record of the asset transfer is logged in the blockchain 430/454 assuming that the blockchains are different from one another, or, are logged in the same blockchain used by all members. Responsibility for the transferred assets can be based on asset values (e.g., access keys) as described herein.

FIG. 5 illustrates blockchain blocks 500 that can be added to a distributed ledger, according to example embodiments, and contents of block structures 502A to 502n. Referring to FIG. 5, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 602A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a crypto-currency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5, a block 502A (also referred to as a data block) that is stored on the blockchain and/or the distributed ledger may include multiple data segments such as a block header 504A to 504n, transaction specific data 506A to 506n, and block metadata 508A to 508n. It should be appreciated that the various depicted blocks and their contents, such as block 502A and its contents are merely for purposes of an example and are not meant to limit the scope of the example embodiments. In some cases, both the block header 504A and the block metadata 508A may be smaller than the transaction specific data 506A which stores entry data; however, this is not a requirement. The block 502A may store transactional information of N entries (e.g., 100, 500, 1000, 2000, 3000, etc.) within the block data 510A to 510n. The block 502A may also include a link to a previous block (e.g., on the blockchain) within the block header 504A. In particular, the block header 504A may include a hash of a previous block's header. The block header 504A may also include a unique block number, a hash of the block data 510A of the current block 502A, and the like. The block number of the block 502A may be unique and assigned in an incremental/sequential order starting from zero. The first block in the blockchain may be referred to as a genesis block which includes information about the blockchain, its members, the data stored therein, etc.

The block data 510A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 510A may also store transaction specific data 506A which adds additional information to the hash-linked chain of blocks in the blockchain. Accordingly, the data 506A can be stored in an immutable log of blocks on the distributed ledger. Some of the benefits of storing such data 506A are reflected in the various embodiments disclosed and depicted herein. The block metadata 508A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 510A and a validation code identifying whether an entry was valid/invalid.

The other blocks 502B to 502n in the blockchain also have headers, files, and values. However, unlike the first block 502A, each of the headers 504A to 504n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 512, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 608 and/or cache memory 610. Computer system/server 602 may further include other removable/non-removable, volatile/non-volatile computer system storage media. By way of example only, memory 606 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices via an I/O adapter 612, such as a keyboard, a pointing device, a display, etc.; one or more devices that enable a user to interact with computer system/server 602; and/or any devices (e.g., network card, modem, etc.) that enable computer system/server 602 to communicate with one or more other computing devices. Such communication can occur via I/O interfaces of the adapter 612. Still yet, computer system/server 602 can communicate with one or more networks such as a local area network (LAN), a general wide area network (WAN), and/or a public network (e.g., the Internet) via a network adapter. As depicted, adapter 612 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
analyzing a first data, by a moving vehicle, to determine an initial issue;
querying, by the moving vehicle, a server for a second data based on the analyzing,
wherein the second data is one or more of at least one second video and at least one second image of the moving transport; and
verifying, by the moving vehicle, an issue exists based on a delta above a threshold between the first data and the second data.

2. The method of claim 1, comprising analyzing the second data, by the moving vehicle, to determine the initial issue.

3. The method of claim 1, wherein the at least one second video and at least one second image relate to one or more of a normal operation of the moving transport, and a normal appearance of the moving transport.

4. The method of claim 1, notifying, by the server, at least one of the transport and an occupant of the transport, the verified issue.

5. The method of claim 1, wherein the verifying is performed by the server.

6. The method of claim 1, comprising alleviating, by at least one of the moving transport and the server, the verified issue when the moving transport is one or more of autonomous and semi-autonomous.

7. The method of claim 1, comprising executing a smart contract, by one or more of the moving vehicle and the server, verifying the delta using a consensus based on the second data, wherein smart contact is stored on a blockchain, and wherein the blockchain is stored on one or more of the moving vehicle and the server.

8. The method of claim 1, comprising alleviating, by at least one of the moving transport and the server, the verified issue when the moving transport is one or more of autonomous and semi-autonomous.

9. A system, comprising:
a processor of a transport;
a memory on which are stored machine readable instructions that when executed by the processor, cause the processor to:
analyze a first data, by a moving vehicle, to determine an initial issue;
query, by the moving vehicle, a server for a second data based on the analyzation,
wherein the second data is one or more of at least one second video and at least one second image of the moving transport; and
verify, by the moving vehicle, an issue exists based on a delta above a threshold between the first data and the second data.

10. The system of claim 9, wherein the processor is further configured to analyze the second data to determine the initial issue.

11. The system of claim 9, wherein the at least one second video and at least one second image relate to one or more of a normal operation of the transport in motion and a normal appearance of the transport in motion.

12. The system of claim 9, wherein the processor is further configured to notify, by the server, at least one of the transport and an occupant of the transport, the verified issue.

13. The system of claim 9, wherein the verification is performed by the server.

14. The system of claim 9, wherein the processor is further configured to alleviate, by at least one of the transport in motion and the server, the verified issue when the transport in motion is one or more of autonomous and semi-autonomous.

15. The system of claim 9, wherein the processor is further configured to execute a smart contract, by one or more of the vehicle in motion and the server, to verify the delta by the use of a consensus based on the second data, wherein smart contact is stored on a blockchain, and wherein the blockchain is stored on one or more of the vehicle in motion and the server.

16. A non-transitory computer readable medium comprising instructions, that when read by a processor, cause the processor to perform:
analyzing a first data, by a moving vehicle, to determine an initial issue;
querying, by the moving vehicle, a server for a second data based on the analyzing,
wherein the second data is one or more of at least one second video and at least one second image of the moving transport; and
verifying, by the moving vehicle, an issue exists based on a delta above a threshold between the first data and the second data.

17. The non-transitory computer readable medium of claim 16, comprising analyzing the second data, by the moving vehicle, to determine the initial issue.

18. The non-transitory computer readable medium of claim 16, wherein the at least one second video and at least one second image relate to one or more of a normal operation of the moving transport, and a normal appearance of the moving transport.

19. The non-transitory computer readable medium of claim 16, notifying, by the server, at least one of the transport and an occupant of the transport, the verified issue.

20. The non-transitory computer readable medium of claim 16, wherein the verifying is performed by the server.

* * * * *